US008208459B2

(12) United States Patent
Horn et al.

(10) Patent No.: US 8,208,459 B2
(45) Date of Patent: Jun. 26, 2012

(54) PARTITIONED TRAFFIC SEGMENT COMMUNICATIONS METHODS AND APPARATUS

(75) Inventors: Gavin Horn, La Jolla, CA (US); Ashwin Sampath, Princeton, NJ (US); Junyi Li, Bedminster, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 12/267,962

(22) Filed: Nov. 10, 2008

(65) Prior Publication Data

US 2010/0118794 A1 May 13, 2010

(51) Int. Cl.
*H04B 7/212* (2006.01)
*H04B 7/208* (2006.01)
*H04W 4/00* (2009.01)
*H04J 3/00* (2006.01)

(52) U.S. Cl. ........ 370/348; 370/322; 370/330; 370/337; 370/344; 370/498

(58) Field of Classification Search ................ 370/319, 370/321, 322, 329, 330, 336, 337, 344, 345, 370/347, 348, 498
See application file for complete search history.

(56) References Cited

U.S. PATENT DOCUMENTS

| 5,752,193 | A | 5/1998 | Scholefield et al. |
|---|---|---|---|
| 5,953,326 | A | 9/1999 | Nakamura et al. |
| 7,058,113 | B2 | 6/2006 | Etoh |
| 7,797,012 | B1 | 9/2010 | Longoni et al. |
| 2004/0029553 | A1 | 2/2004 | Cain |
| 2004/0214582 | A1* | 10/2004 | Lan et al. ................... 455/452.2 |
| 2005/0271028 | A1* | 12/2005 | Proctor ......................... 370/345 |
| 2006/0009228 | A1 | 1/2006 | Kang et al. |
| 2006/0203765 | A1 | 9/2006 | Laroia et al. |
| 2007/0019717 | A1 | 1/2007 | Laroia et al. |
| 2007/0047503 | A1 | 3/2007 | Gonorovsky et al. |
| 2008/0056221 | A1 | 3/2008 | Xu |
| 2009/0279475 | A1* | 11/2009 | Vanderaar et al. ............ 370/321 |
| 2010/0118793 | A1 | 5/2010 | Horn et al. |
| 2012/0069877 | A1 | 3/2012 | Tzannes et al. |

(Continued)

FOREIGN PATENT DOCUMENTS

EP 0940936 9/1999

OTHER PUBLICATIONS

International Search Report/Written Opinion—PCT/US09/063297—International Search Authority EPO—Mar. 1, 2010.

*Primary Examiner* — Ronald Abelson
(74) *Attorney, Agent, or Firm* — Peng Zhu; James K. O'Hare

(57) ABSTRACT

Methods and apparatus related to partitioning traffic segments are described. An access router, having concurrent connections with two access terminals, each desiring to transmit traffic signals to the access router in the same traffic segment, partitions a traffic segment. The partition is such that a first portion of the traffic segment is allocated to a first access terminal and a second portion of the traffic segment is allocated to the second access terminal. Control information, e.g., conveying partition information, is communicated to access terminals prior to the traffic segment. In some embodiments, the partition information is communicated as part of a transmission request response signal, e.g., via phase of the request response signal. An access terminal which has been allocated a traffic segment partition portion identifies is allocation from the transmitted control information, and subsequently transmits traffic signals to the access router in its allocated portion of the traffic segment.

15 Claims, 16 Drawing Sheets

FOREIGN PATENT DOCUMENTS

| | | |
|---|---|---|
| EP | 1672842 | 6/2006 |
| EP | 1677460 A1 | 7/2006 |
| EP | 1763275 | 3/2007 |
| WO | WO2006075042 | 7/2006 |

* cited by examiner

PARTITIONED TRAFFIC SEGMENT COMMUNICATIONS METHODS AND APPARATUS

FIELD

Various embodiments relate to wireless communications, and more particularly, to methods and apparatus related to partitioned traffic segments.

BACKGROUND

In some wireless communications systems, air link resources are divided according to a timing structure such that a recurring set of traffic segments are available on a predictable basis. In a system in which traffic scheduling is performed in a decentralized manner, it can be a challenging task to efficiently utilize the available air link traffic resources. Different types of devices may have different capabilities in regards to connections that can be concurrently supported and/or different capabilities regarding monitoring and/or tracking activity in its region. Different devices may also have different traffic needs, e.g., in terms of the amount of traffic to be communicated and/or latency considerations. In addition, at different times, the same device may have different traffic needs, e.g., as a function of time of day, applications being executed, etc. Selecting a set of fixed size traffic segments in a recurring timing structure may work well in some situations but be inefficient in other situations.

Based on the above discussion there is a need for methods and apparatus providing flexibility in allocating and/or using traffic resources. It would be beneficial if one or more new methods and apparatus were developed relating to resource use and/or allocation, which can accommodate the different device capabilities present in a communications network, while providing flexibility in efficiently scheduling and/or utilizing traffic air link resources.

SUMMARY

Methods and apparatus relating to scheduling of air link resources, e.g., traffic segments, in a wireless communications system are described. Various described methods and apparatus are well suited to wireless peer to peer networks in which traffic scheduling is decentralized, e.g. an ad hoc peer to peer network. Various methods and apparatus relate to the partitioning of traffic segments, e.g., dynamic partitioning of traffic segments in a peer to peer communications network, between multiple connections, the multiple connections having an access router in common.

In some embodiments, if the decentralized scheduling decides to allocate a traffic segment to a peer to peer connection corresponding to two access terminals the traffic segment is not partitioned. However, if the decentralized scheduling decides to allocate a traffic segment to a connection including an access router as a participant, then the traffic segment may be, and sometimes is, partitioned. Thus, access routers which typically have different, e.g., more advanced, device capabilities from access terminals, are treated differently in the peer to peer communications system. This approach can provide for more efficient utilization of the air link traffic resources, e.g., limiting wastage, allowing higher overall throughput and/or reducing latency, in the peer to peer network.

Methods and apparatus related to partitioning traffic segments are described. An access router, having concurrent connections with two access terminals, each desiring to transmit traffic signals to the access router in the same traffic segment, partitions a traffic segment. The partition is such that a first portion of the traffic segment is allocated to a first access terminal and a second portion of the traffic segment is allocated to the second access terminal. Control information, e.g., conveying partition information, is communicated to access terminals prior to the traffic segment. In some embodiments, the partition information is communicated as part of one of: a transmission request response signal and a channel quality indicator signal. In some embodiments, partition information is communicated via phase of a request response signal. In some embodiments, partition information is communicated via a partition assignment signal. An access terminal which has been allocated a traffic segment partition portion identifies is allocation from the transmitted control information, and subsequently transmits traffic signals to the access router in its allocated portion of the traffic segment.

An exemplary method of operating an access terminal, in some embodiments, comprises: receiving at least one signal from an access router, said at least one signal corresponding to a first traffic segment; and determining, at least based on said received at least one signal, a partition portion of said first traffic segment allocated to said access terminal for communicating with said access router. An exemplary access terminal, in accordance with some embodiments, comprises a memory and at least one processor configured to: receive at least one signal from an access router, said at least one signal corresponding to a first traffic segment; and determine, at least based on said received at least one signal, a partition portion of said first traffic segment allocated to said access terminal for communicating with said access router.

An exemplary method of operating an access router, in some embodiments, comprises: receiving transmission requests corresponding to a first traffic segment from a plurality of access terminals; and allocating first traffic segment partition portions to a set of access terminals, said plurality of access terminals including said set of access terminals. The exemplary method further comprises transmitting transmission request responses corresponding to said first traffic segment to said set of access terminals. An exemplary access router, in accordance with some embodiments, comprises memory and at least one processor configured to: receive transmission requests corresponding to a first traffic segment from a plurality of access terminals; allocate first traffic segment partition portions to a set of access terminals, said plurality of access terminals including said set of access terminals; and transmit transmission request responses corresponding to the first traffic segment to said set of access terminals.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
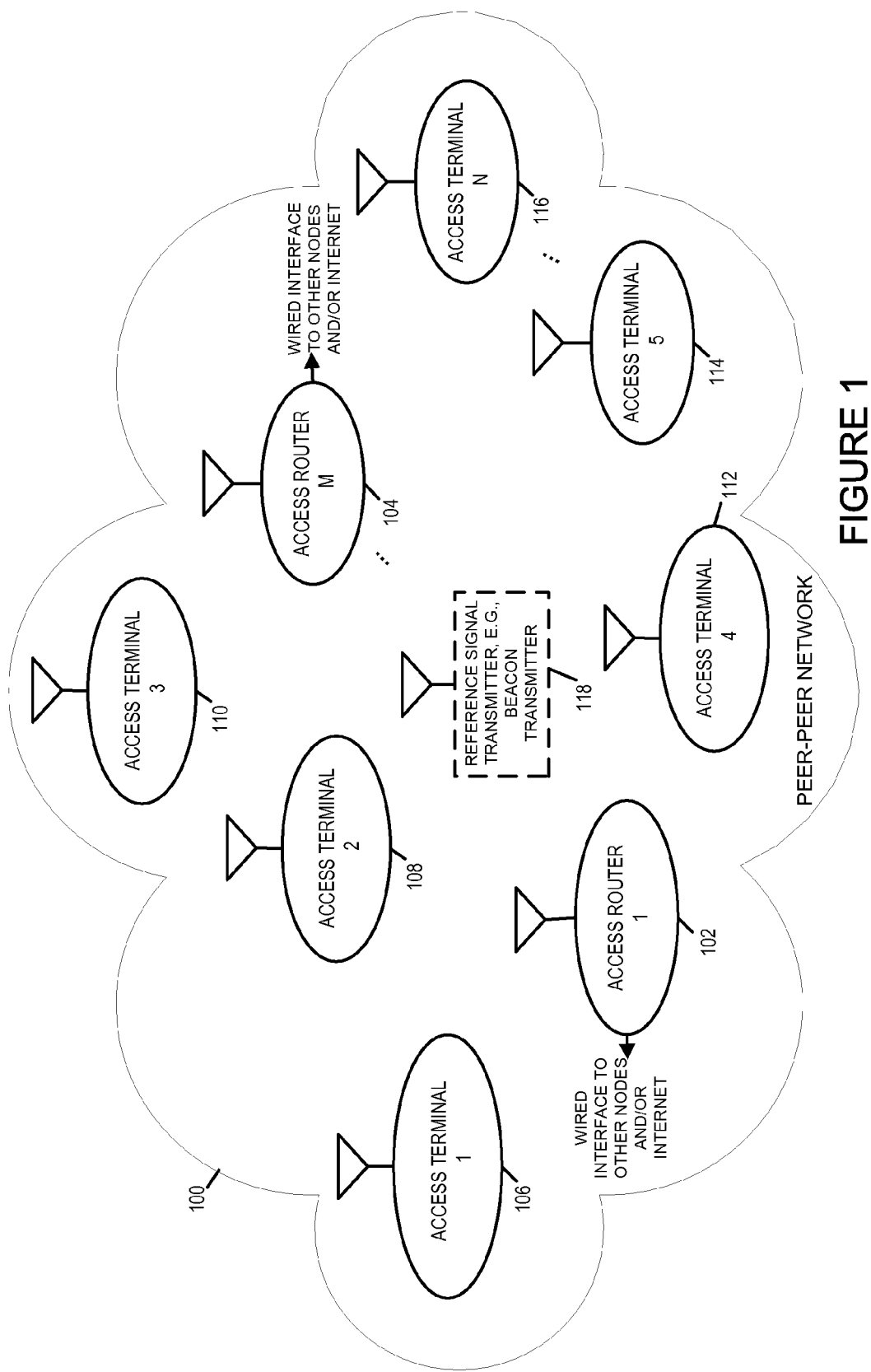
FIG. 1 is a drawing of an exemplary peer to peer network, e.g., an ad-hoc communications network, in accordance with an exemplary embodiment.

FIG. 1 is a drawing of an exemplary peer to peer network 100, e.g., an ad-hoc communications network, in accordance with an exemplary embodiment. The exemplary network supports peer to peer traffic signaling by communication devices, e.g., access routers and access terminals. The access routers are, e.g., stationary communications devices supporting multiple concurrent peer to peer wireless connections and including both a wireless interface and a wired interface. The access terminals are, e.g., mobile and/or stationary wireless terminals, each including a wireless interface and supporting a peer to peer wireless connection. The exemplary network 100 supports decentralized scheduling of traffic air link resources, e.g., traffic segments, on a slot by slot basis. The exemplary network 100 supports, for at least some traffic segments in which an access router is one of the peer to peer communications devices using the traffic segment, segment partitioning of the traffic segment.

Exemplary peer to peer network 100 includes a plurality of access routers (access router 1 102, . . . , access router M 104) and a plurality of access terminals (access terminal 1 106, access terminal 2 108, access terminal 3 110, access terminal 4 112, access terminal 5 114, . . . , access terminal N 116). The access routers (102, . . . , 104) and the access terminals (106, 108, 110, 112, 114, . . . , 116) support peer to peer traffic signaling. In some embodiments, the network 100 includes a reference signal transmitter 118, e.g., a beacon transmitter. The communications devices (102, 104, 106, 108, 110, 112, 114, 116) in the communications network 100 can establish connections with one another, e.g., peer to peer connections, generate and transmit traffic transmission request signals, receive and process traffic transmission request signals, generate and transmit traffic transmission request response signals, receive and process traffic transmission request response signals, receive and process peer to peer traffic signals, and generate and transmit peer to peer traffic signals. When an access router has multiple concurrent peer to peer connections, a traffic segment may be, and sometimes is, partitioned with different portions of the traffic segment corresponding to different concurrent connections.

There is a recurring timing structure used in the network 100. In some embodiments a reference signal, e.g., an OFDM beacon signal from reference signal transmitter 118, is used by the access terminals and/or access routers to synchronize with respect to the timing structure. Alternatively, a signal used to synchronize with the timing structure may be sourced from another device, e.g., a GPS transmitter, a base station or another peer to peer device. In some embodiments, access routers (102, 104) synchronize via backhaul network signaling. In some embodiments, the access routers (102, 104) transmit reference signals which are used by an access terminal in its vicinity to synchronize with respect to the peer to peer timing structure. The peer to peer timing structure used in the network includes a plurality of individual traffic slots.

Figure 2A:
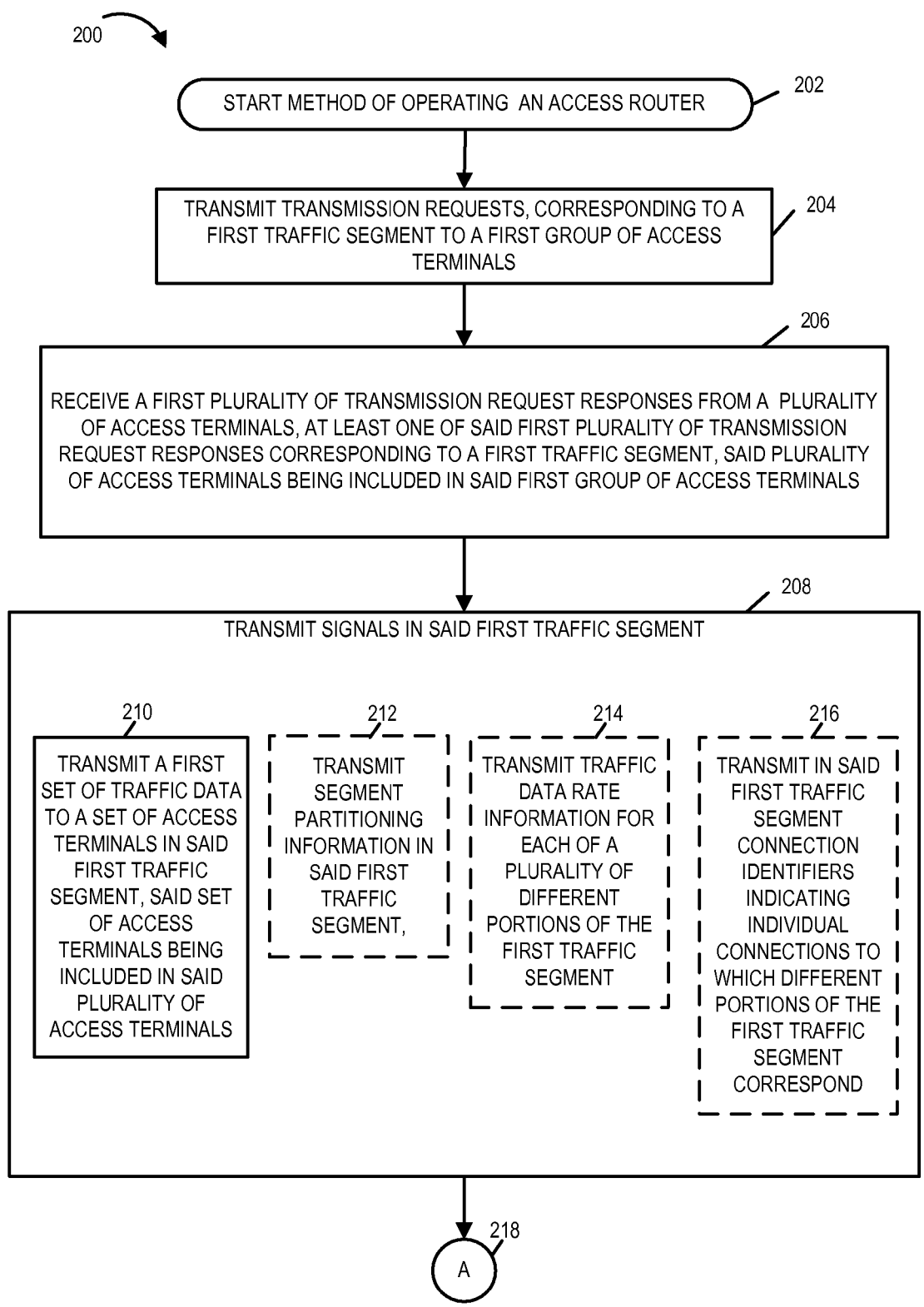
FIG. 2, comprising the combination of FIG. 2A and FIG. 2B, is a flowchart of an exemplary method of operating an access router in accordance with an exemplary embodiment.
Figure 2B:
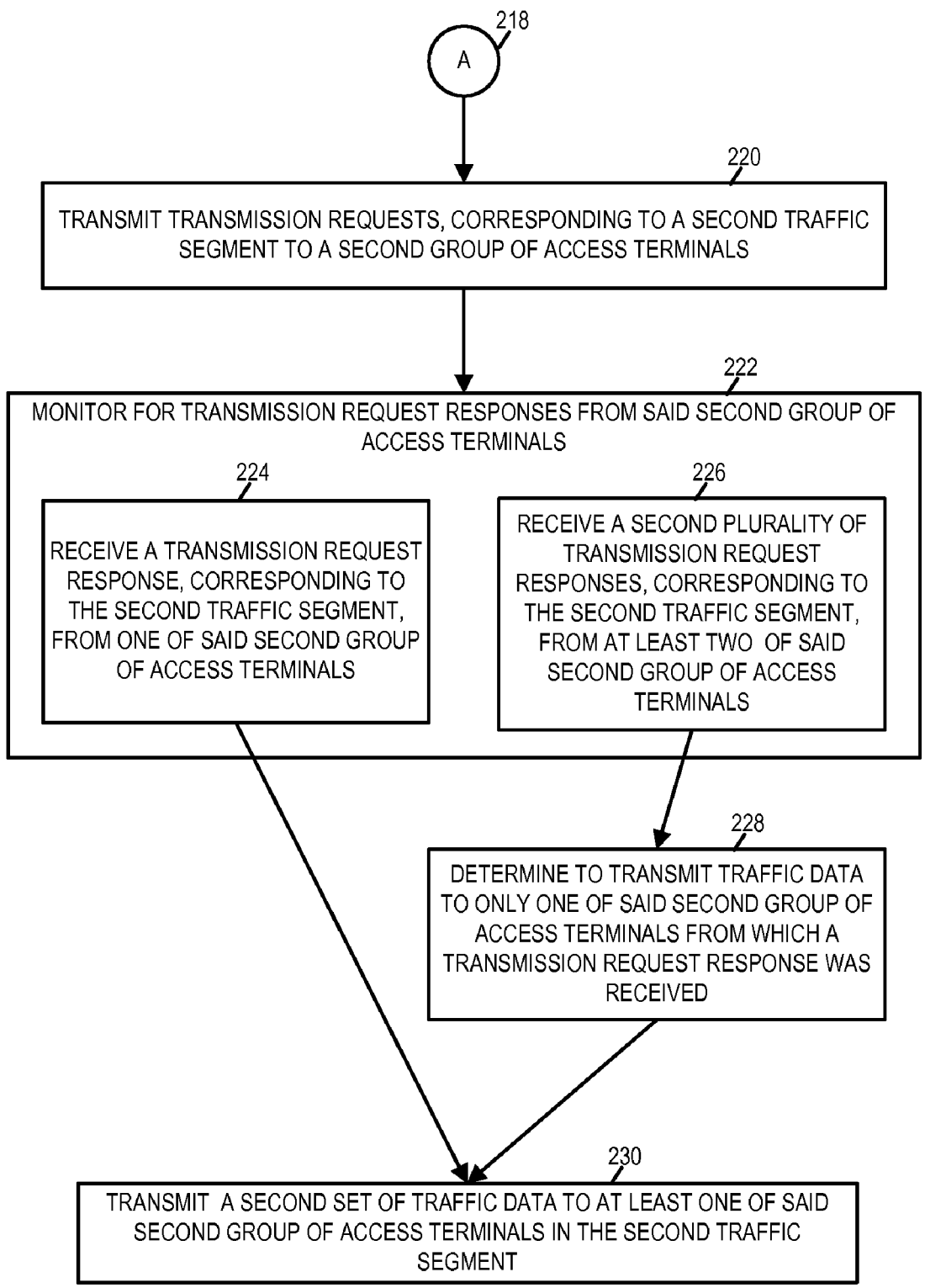

FIG. 2, comprising the combination of FIG. 2A and FIG. 2B, is a flowchart 200 of an exemplary method of operating an access router, in accordance with an exemplary embodiment. The access router is, e.g., one of the access routers (102, 104) in exemplary peer to peer wireless communications network 100 of FIG. 1. Operation starts in step 202, where the access router is powered on an initialized and proceeds to step 204.

In step 204, the access router transmits transmission requests, corresponding to a first traffic segment, to a first group of access terminals. The access router has existing peer to peer connections with each of the first group of access terminals. Operation proceeds from step 204 to step 206.

In step 206 the access router receives a first plurality of transmission request responses from a plurality of access terminals, at least one of said first plurality of transmission request responses corresponding to a first traffic segment, said plurality of access terminals being access terminals included in said first group of access terminals. Operation proceeds from step 206 to step 208.

In step 208 the access router transmits signals in the first traffic segment. Step 208 includes sub-step 210, in which the access router transmits a first set of traffic data, corresponding to a set of access terminals, in said first traffic segment, said set of access terminals being included in said plurality of access terminals. In some embodiments, at times, transmitting said first set of traffic data includes transmitting to a first access terminal of said set of access terminals at a first transmission power level and transmitting to a second access terminal of said set of access terminals at a second transmission power level, which is different from said first transmission power level.

Step 208, in some embodiments, includes one or more of sub-steps 212, 214 and 216. In sub-step 212 the access router transmits segment partitioning information in said first traffic segment. The segment partitioning information, in some embodiments, indicates at least one portion and a corresponding portion size of the first traffic segment for one of the said set of access terminals. In sub-step 214, the access router transmits traffic data rate information for each of a plurality of different portions of the first traffic segment. In sub-step 216 the access router transmits in said first traffic segment connection identifiers indicating individual connections to which different portions of first traffic segment correspond. Operation proceeds from step 208 via connecting node A 218 to step 220.

In step 220 the access router transmits transmission requests, corresponding to a second traffic segment, to a second group of access terminals. The access router has existing peer to peer connections with each of the second group of access terminals. Operation proceeds from step 220 to step 222. In step 222 the access router monitors for transmission request responses from said second group of access terminals. Step 222 includes sub-step 224 and 226 of which one is performed. In sub-step 224 the access router receives a transmission request response, corresponding to the second traffic segment, from a one of said second group of access terminals. Operation proceeds from sub-step 224 to step 230. Returning to sub-step 226, in sub-step 226 the access router receives a second plurality of transmission request responses, corresponding to the second traffic segment, from at least two of said second group of access terminals. Operation proceeds from step 226 to step 228. In step 228 the access router determines to transmit traffic data to only one of said second group of access terminals from which a transmission request response was received.

Operation proceeds from step 228 to step 230. In step 230 the access router transmits a second set of traffic data to at least one of said second group of access terminals in the second traffic segment. In some embodiments, the second set of traffic data is transmitted in the second traffic segment without segment partitioning information and without rate information. In some embodiments, the first and second traffic segments are of the same size.

Figure 3:
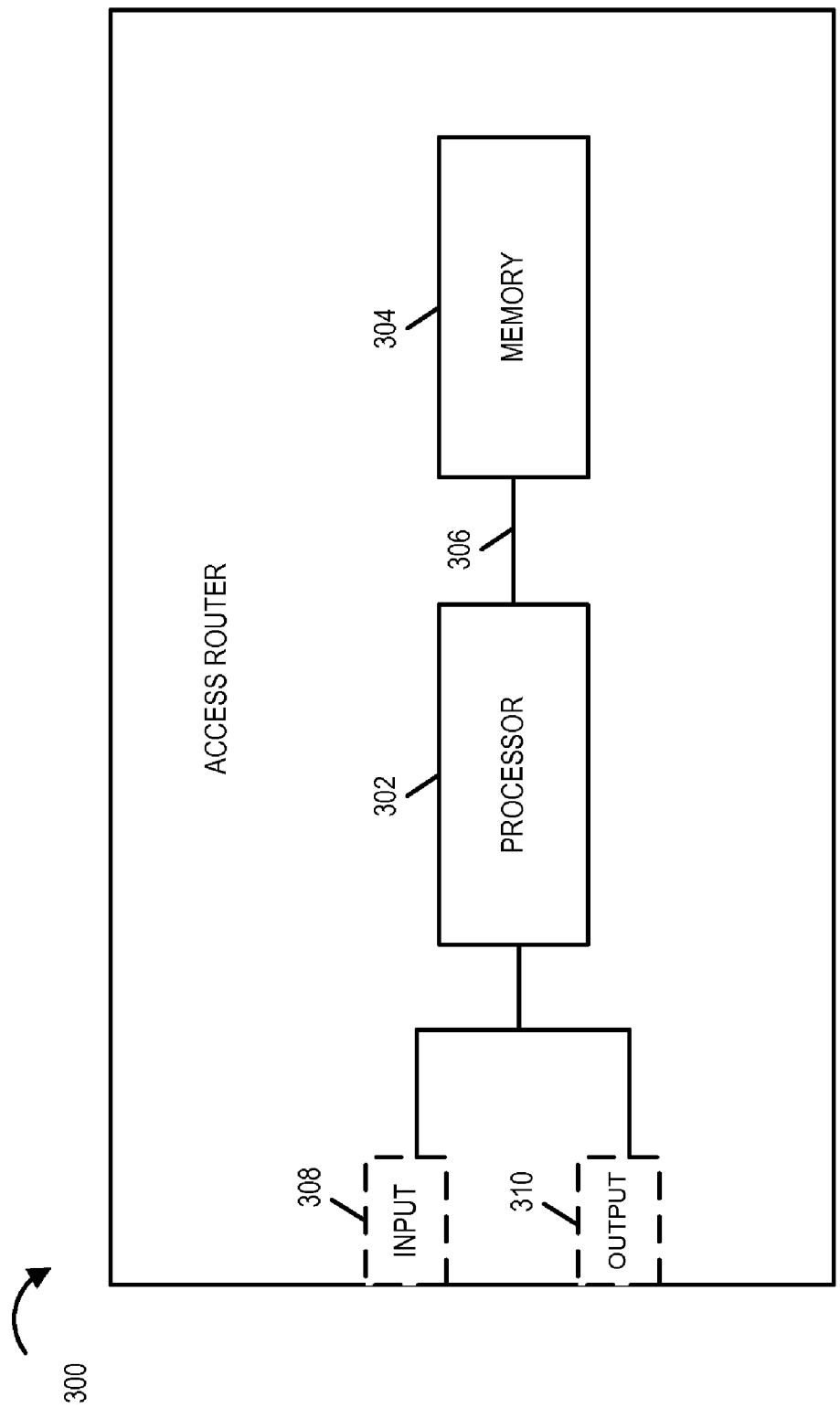
FIG. 3 is a drawing of an exemplary access router, in accordance with an exemplary embodiment.

FIG. 3 is a drawing of an exemplary access router 300 in accordance with an exemplary embodiment. Exemplary access router 300 is, e.g., an access router supporting peer to peer communications and implementing a method in accordance with flowchart 200 of FIG. 2.

Access router 300 includes a processor 302 and memory 304 coupled together via a bus 306 over which the various elements (302, 304) may interchange data and information. Access router 300 further includes an input module 308 and an output module 310 which may be coupled to processor 302 as shown. However, in some embodiments, the input module 308 and output module 310 are located internal to the processor 302. Input module 308 can receive input signals. Input module 308 can, and in some embodiments does, include a wireless receiver and/or a wired or optical input interface for receiving input. Output module 310 may include, and in some embodiments does include, a wireless transmitter and/or a wired or optical output interface for transmitting output. Processor 302 is configured to: receive a first plurality transmission request responses from a plurality of access terminals, at least one of said first plurality of transmission request responses corresponding to a first traffic segment; and transmit a first set of traffic data to a set of access terminals in said first traffic segment, said set of access terminals being included in said plurality of access terminals. In some embodiments, processor 302 is configured to transmit traffic data to a first access terminal in said set of access terminals at a first transmission power level and to transmit traffic data to a second access terminal in said set of access terminal at a second transmission power level, which is different from said first transmission power level, as part of being configured to transmit a first set of traffic data corresponding to a set of access terminals.

In some embodiments, processor 302 is further configured to transmit segment partitioning information in said first traffic segment. In some such embodiments, the segment partitioning information indicates at least one portion and a corresponding portion size of said first traffic segment for one of said set of access terminals.

In some embodiments, processor 302 is configured to transmit traffic data rate information for each of a plurality of different portions of the first traffic segment.

In various embodiments, processor 302 is configured to transmit in said first traffic segment connection identifiers indicating the individual connections to which different portions of the first traffic segment correspond.

In various embodiments, processor 302 is configured to transmit transmission requests, corresponding to said first traffic segment, to each of a group of access terminals, said plurality of access terminals being included in said group of access terminals.

Processor 302 is also configured to transmit transmission requests, corresponding to a second traffic segment, to each of a second group of access terminals; and to transmit a second set of traffic data to at least one of said second group of access terminals in said second traffic segment. In some embodiments, processor 302 is configured to transmit said second set of traffic data without segment partitioning information and without rate information. In various embodiments, the first and second traffic segments are of the same size.

In some embodiments processor 302 is configured to receive a transmission request response, corresponding to the second traffic segment, from one of said second group of access terminals. In some embodiments processor 302 is configured to receive a second plurality of transmission request responses, corresponding to the second traffic segment, from at least two of said second group of access terminals; and to determine to transmit traffic data to only one of said fourth plurality of access terminals from which a transmission request response was received.

Figure 4:
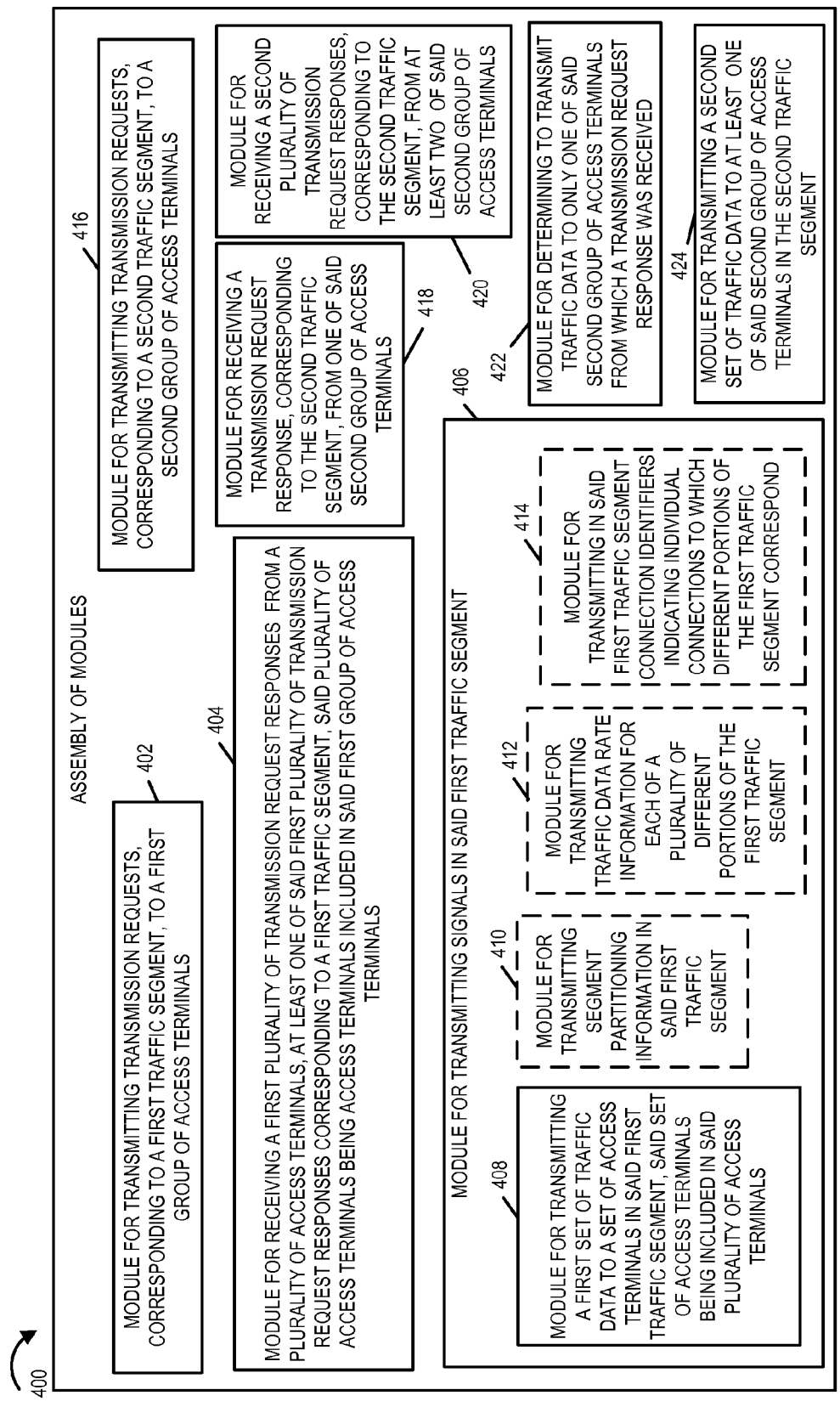
FIG. 4 is a drawing of an assembly of modules that may be used in the access router of FIG. 3.

FIG. 4 is an assembly of modules 400 which can be, and in some embodiments are, used in the access router 300 illustrated in FIG. 3. The modules in the assembly 400 can be implemented in hardware within the processor 302 of FIG. 3, e.g., as individual circuits. Alternatively, the modules may be implemented in software and stored in the memory 304 of the access router 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the access router 300 or elements therein such as the processor 302, to perform the functions of the corresponding steps illustrated in the method flowchart 200 of FIG. 2.

As illustrated in FIG. 4, the assembly of modules 400 includes a module 402 for transmitting transmission requests, corresponding to a first traffic segment, to a first group of access terminals, a module 404 for receiving a first plurality of transmission request responses from a plurality of access terminals, at least one of said first plurality of transmission request responses corresponding to a first traffic segment, said plurality of access terminals being included in said first group of access terminals, and a module 406 for transmitting signals in said first traffic segment. Module 406 includes module 408 for transmitting a first set of traffic data in said first traffic segment, said set of access terminals being access terminals included in said first plurality of access terminals. In some embodiments, module 406 includes one or more of module 410, module 412 and module 414. Module 410 is for transmitting segment partitioning information in said first traffic segment. Module 412 is for transmitting traffic data rate information for each of a plurality of different portions of the first traffic segment, and module 414 is for transmitting in said first traffic segment connection identifiers indicating individual connections to which different portions of the first traffic segment correspond.

Assembly of modules 400 also includes a module 416 for transmitting transmission requests, corresponding to a second traffic segment, to a second group of access terminals, module 418 for receiving a transmission request response, corresponding to the second traffic segment, from one of the second group of access terminals, module 420 for receiving a second plurality of transmission request response, corresponding to the second traffic segment, from at least two of said second group of access terminals, module 422 for determining to transmit traffic data to only one of said second group of access terminals from which a transmission request response was received, and module 424 for transmitting a second set of traffic data to at least one of said second set of access terminals in the second traffic segment. In some such embodiments, module 422 determines which one of said second set of access terminals, from which a transmission request response was received, to transmit to as a function of at least one of: interference information, loading information and quality of service information.

In some embodiments, module 408 is further configured to transmit traffic data to a first access terminal in said set of access terminals in said first traffic segment at a first transmission power level and to transmit traffic data to a second access terminal in said set of access terminal at a second transmission power level, which is different from said first transmission power level.

Module 424, in some embodiments, is configured to transmit traffic data in said second traffic segment without segment partitioning information and without rate information. In various embodiments, the first and second traffic segments are of the same size.

Figure 5:
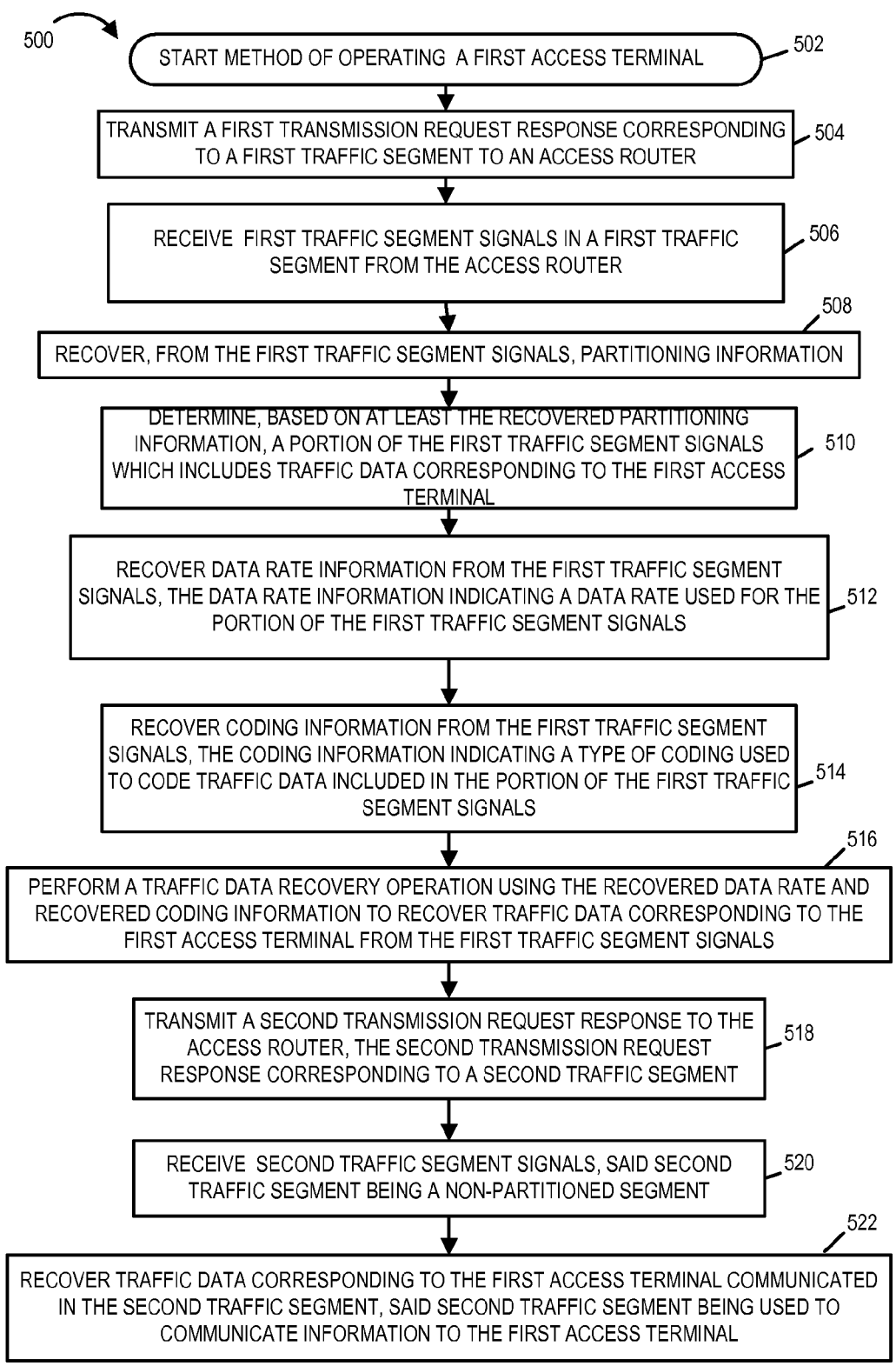
FIG. 5, is a flowchart of an exemplary method of operating a first access terminal in accordance with an exemplary embodiment.

FIG. 5 is a flowchart 500 of an exemplary method of operating a first access terminal in accordance with an exemplary embodiment. The first access terminal is, e.g., one of the access terminals (106, 108, 110, 112, 114, 116) in exemplary peer to peer wireless communications network 100 of FIG. 1. Operation starts in step 502 where the first access terminal is powered on and initialized and proceeds to step 504.

In step 504 the first access terminal transmits a first transmission request response corresponding to a first traffic segment to an access router. Then, in step 506 the first access terminal receives first traffic segment signals in a first traffic segment from the access router. Operation proceeds from step 506 to step 508.

In step 508 the first access terminal recovers, from the first traffic segment signals, partitioning information. Then, in step 510 the first access terminal determines, at least based on the recovered partitioning information, a portion of the first traffic segment signals which includes traffic data corresponding to the first access terminal. Operation proceeds from step 510 to step 512.

In step 512 the first access terminal recovers data rate information from the first traffic segment signals, the data rate information indicating a data rate used for the portion of the first traffic segment signals. Operation proceeds from step 512 to step 514.

In step 514 the first access terminal recovers coding information from the first traffic segment signals, the coding information indicating a type of coding used to code traffic data included in the portion of the first traffic segment signals. In some embodiments the first traffic segment signals further include data rate and coding information corresponding to a second access terminal. Operation proceeds from step 514 to step 516.

In step 516 the first access terminal performs a traffic data recovery operation using the recovered data rate and recovered coding information to recover traffic data corresponding to the first access terminal from the first traffic segment signals. Operation proceeds from step 516 to step 518.

In step 518 the first access terminal transmits a second transmission request response to the access router, the second transmission request response corresponding to a second traffic segment. In some embodiments, the first and second traffic segments are of the same size. Then, in step 520 the first access terminal receives second traffic segment signals, said second traffic segment being a non-partitioned segment. Operation proceeds from step 520 to step 522. In step 522 the first access terminal recovers traffic data corresponding to the first access terminal communicated in the second traffic segment, said second traffic segment being used to communicate information to the first access terminal.

Figure 6:
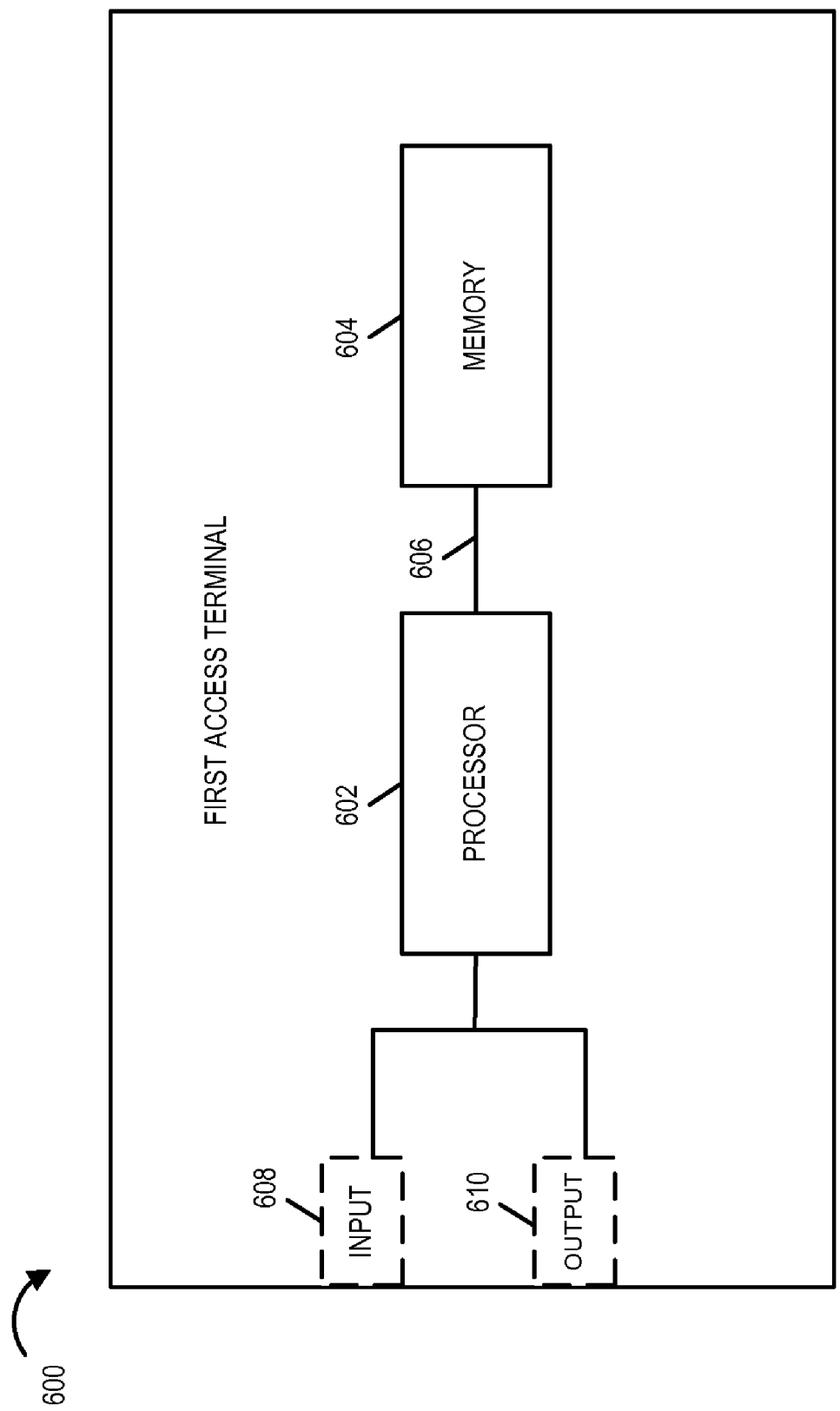
FIG. 6 is a drawing of an exemplary first access terminal in accordance with an exemplary embodiment.

FIG. 6 is a drawing of an exemplary first access terminal 600 in accordance with an exemplary embodiment. Exemplary access terminal 600 is, e.g., an access terminal supporting peer to peer communications and implementing a method in accordance with flowchart 500 of FIG. 5.

Access terminal 600 includes a processor 602 and memory 604 coupled together via a bus 606 over which the various elements (602, 604) may interchange data and information. Access terminal 600 further includes an input module 608 and an output module 610 which may be coupled to processor 602 as shown. However, in some embodiments, the input module 608 and output module 610 are located internal to the processor 602. Input module 608 can receive input signals. Input module 608 can, and in some embodiments does, include a wireless receiver for receiving input signals. Output module 610 may include, and in some embodiments does include, a wireless transmitter for transmitting output signals. Processor 602 is configured to: receive first traffic segment signals in a first traffic segment from an access router; recover from the first traffic segment signals partitioning information; and at least based on the recovered partitioning information, determine a portion of the first traffic segment signals which includes traffic data corresponding to the first access terminal.

In some embodiments, processor 602 is further configured to recover data rate information from the first traffic segment signals, the data rate information indicating a data rate used for the portion of the first traffic segment signals. In various embodiments, processor 602 is configured to recover coding information from the first traffic segment signals, the coding information indicating a type of coding used to code traffic data included in the portion of the first traffic segment signals. In some embodiment, the first traffic segment signals further include data rate and coding information corresponding to a second access terminal.

In some embodiments, the processor 602 is configured to perform, a traffic data recovery operation using the recovered data rate and recovered coding information to recover traffic data corresponding to the first access terminal from the first traffic segment signals.

Processor 602, in some embodiments, is configured to transmit a first transmission request response corresponding to the first traffic segment to said access router.

Process 602, is some embodiments, is further configured to transmit a second transmission request response to the access router, the second transmission request response corresponding to a second traffic segment; to receive second traffic segment signals, said second traffic segment being a non-partitioned segment; and to recover traffic data corresponding to the first access terminal communicated in the second traffic segment, said second traffic segment being used to communicate information to the first access terminal. In various embodiments, the first and second traffic segments are of the same size.

Figure 7:
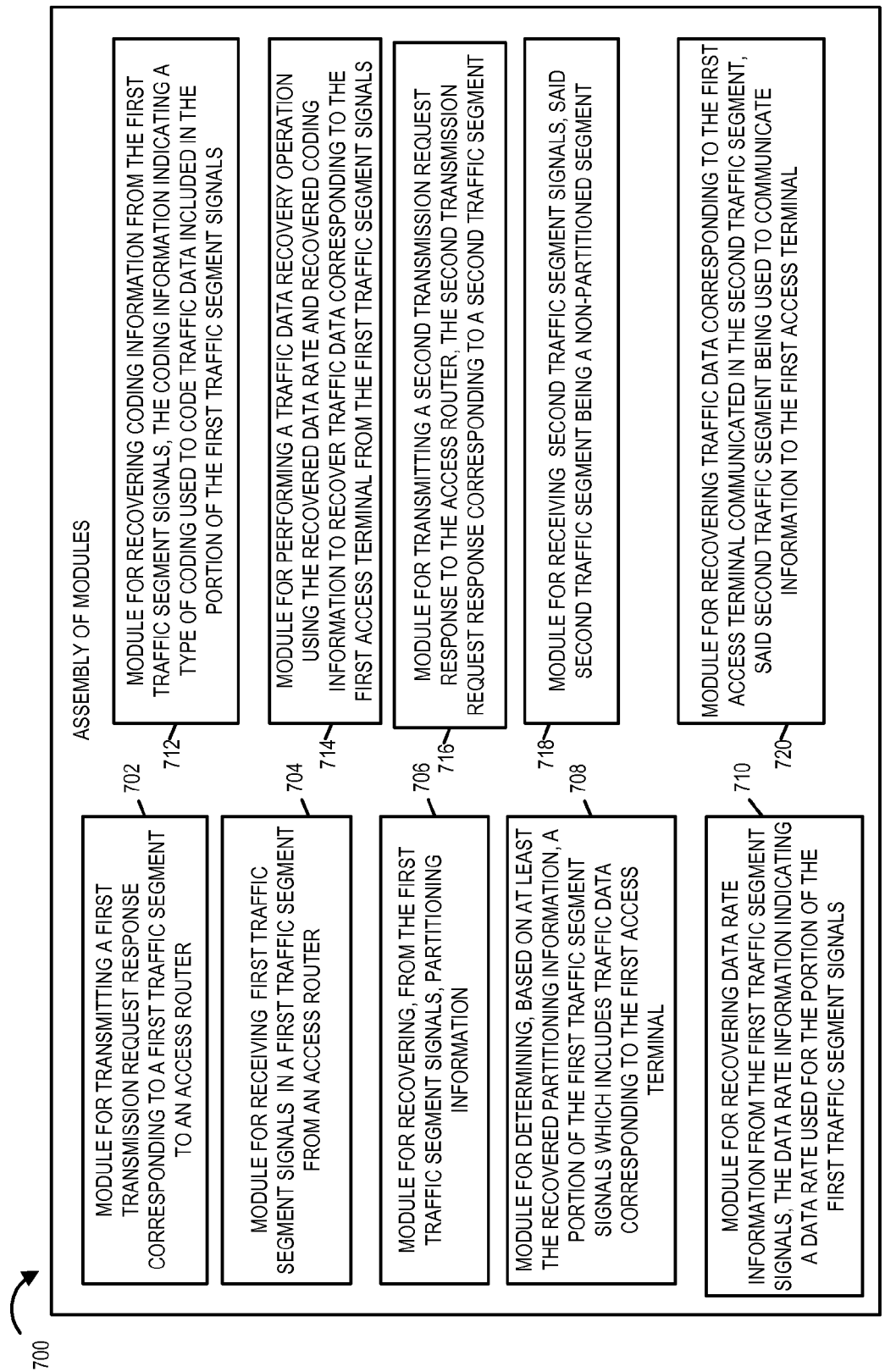
FIG. 7 is a drawing of an assembly of modules that may be used in the access terminal of FIG. 6.

FIG. 7 is an assembly of modules 700 which can be, and in some embodiments are, used in the access terminal 600 illustrated in FIG. 6. The modules in the assembly 700 can be implemented in hardware within the processor 602 of FIG. 6, e.g., as individual circuits. Alternatively, the modules may be implemented in software and stored in the memory 604 of the access terminal 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the access terminal 600 or elements therein such as the processor 602, to perform the functions of the corresponding steps illustrated in the method flowchart 500 of FIG. 5.

As illustrated in FIG. 7, the assembly of modules 700 includes a module 702 for transmitting a first transmission request response corresponding to a first traffic segment to an access router; a module 704 for receiving first traffic segment signals in a first traffic segment from an access router; a module 706 for recovering from the first traffic segment signals, partitioning information, and a module 708 for determining, at least based on the recovered partitioning information, a portion of the first traffic segment signals which includes traffic data corresponding to the first access terminal. Assembly of modules 700 further includes: a module 710 for recovering data rate information from the first traffic segment signals, the data rate information indicating a data rate used for the portion of the first traffic segment signals, a module 712 for recovering coding information from the first traffic segment signals, the coding information indicating a type of coding used to code traffic data included in the portion of the first traffic segment signals; a module 714 for performing a traffic data recovery operation using the recovered data rate and recovered coding information to recover traffic data corresponding to the first access terminal from the first traffic segment signals; a module 716 for transmitting a second transmission request response to the access router, the second transmission request response corresponding to a second traffic segment; and a module 718 for receiving second traffic segment signals, said second traffic segment being a non-partitioned segment. Assembly of modules 700 further includes a module 720 for recovering traffic data corresponding to the first access terminal communicated in the second traffic segment, said second traffic segment being used to communicate information to the first access terminal.

In some embodiments, the first traffic segment signals further include data rate and coding information corresponding to a second access terminal. In some embodiments, the first and second traffic segments are of the same size.

Figure 8:
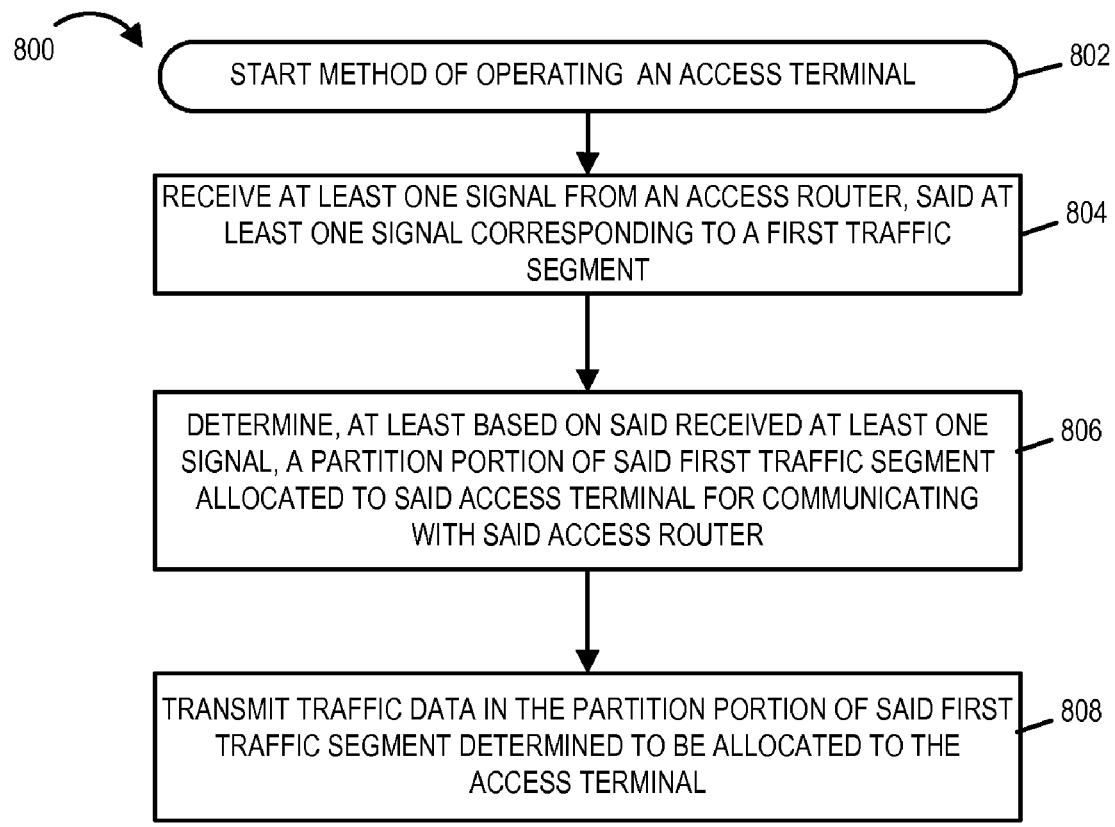
FIG. 8 is a flowchart of an exemplary method of operating an access terminal in accordance with an exemplary embodiment.

FIG. 8 is a flowchart 800 of an exemplary method of operating an access terminal in accordance with an exemplary embodiment. The access terminal is, e.g., one of the access terminals (106, 108, 110, 112, 114, 116) in exemplary peer to peer wireless communications network 100 of FIG. 1. Operation of the exemplary method starts in step 802 where the access terminal is powered on and initialized and proceeds to step 804.

In step 804 the access terminal receives at least one signal from an access router, said at least one signal corresponding to a first traffic segment. In some embodiments, the at least one signal is a transmission request response signal. In some other embodiments, the at least one signal is an assignment signal indicating partition of assignment to the access terminal. The at least one signal may be, and sometimes is, one of a plurality of transmission request responses corresponding to the first traffic segment that are transmitted by the access router.

Then, in step 806 the access terminal determines, at least based on said received at least one signal, a partial portion of said first traffic segment allocated to the access terminal for communication with the access router. In some embodiments, determining a partition portion of the first traffic segment allocated to the access terminal includes determining a partition portion based on a total number of transmission request responses received from the access router which correspond to the first traffic segment. In some embodiments, determining a partition portion of the first traffic segment allocated to the access terminal includes detecting the phase of said at least one signal and determining from the detected phase the partition portion of the first traffic segment allocated to the access terminal. In some embodiments, there are a number of predetermined fixed partition options and the detected phase indicates one of the predetermined fixed partition options.

Operation proceeds from step 806 to step 808. In step 808 the access terminal transmits traffic data in the partition portion of the first traffic segment determined to be allocated to the access terminal.

Figure 9:
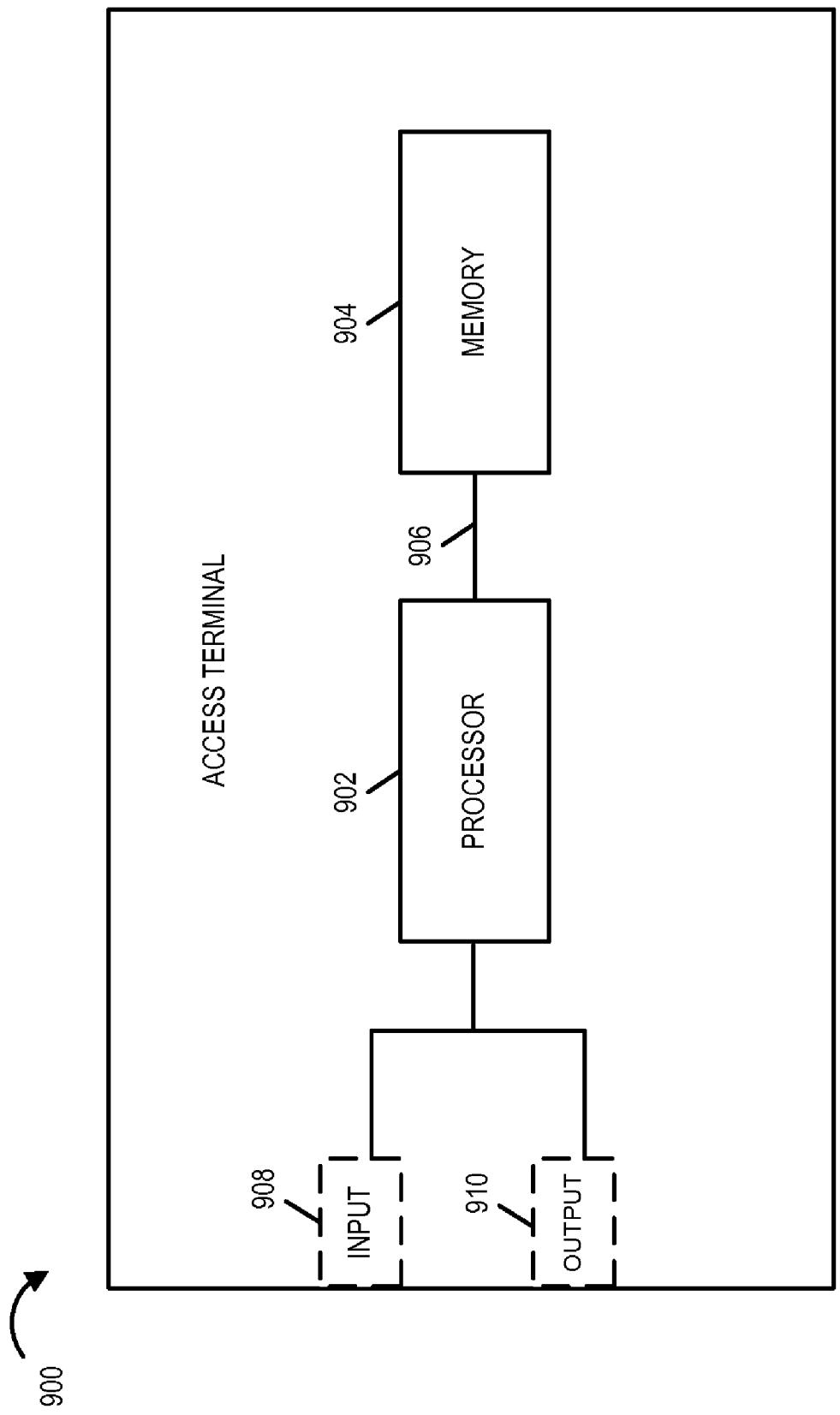
FIG. 9 is a drawing of an exemplary access terminal in accordance with an exemplary embodiment.

FIG. 9 is a drawing of an exemplary access terminal 900 in accordance with an exemplary embodiment. Exemplary access terminal 900 is, e.g., an access terminal supporting peer to peer communications and implementing a method in accordance with flowchart 800 of FIG. 8.

Access terminal 900 includes a processor 902 and memory 904 coupled together via a bus 906 over which the various elements (902, 904) may interchange data and information. Access terminal 900 further includes an input module 908 and an output module 910 which may be coupled to processor 902 as shown. However, in some embodiments, the input module 908 and output module 910 are located internal to the processor 302. Input module 908 can receive input signals. Input module 908 can, and in some embodiments does, include a wireless receiver for receiving input signals. Output module 308 may include, and in some embodiments does include, a wireless transmitter for transmitting output signals. Processor 902 is configured to: receive at least one signal from an access router, said at least one signal corresponding to a first traffic segment; and determine, at least based on said received at least one signal, a partition portion of said first traffic segment allocated to said access terminal for communicating with said access router. The processor 902 is further configured to transmit traffic data in the partition portion of said first traffic segment determined to be allocated to said access terminal.

The at least one signal, in some embodiments, is a transmission request response signal. The at least one signal, in some embodiments, is an assignment signal indicating partition assignment to the access terminal. In some embodiments, said at least one signal is one of a plurality of transmission request responses corresponding to said first traffic segment that are transmitted by said access router; and the processor 902 is further configured to determine a partition portion based on a total number of transmission request responses received from said access router which correspond to said first traffic segment.

Processor 902, in some embodiments, is configured to: detect a phase of said at least one signal; and determine from the detected phase the partition portion of said first traffic segment allocated to said access terminal. In some such embodiments, there are a number of predetermined fixed partition options, and the detected phase indicates one of said predetermined fixed partition options.

Figure 10:
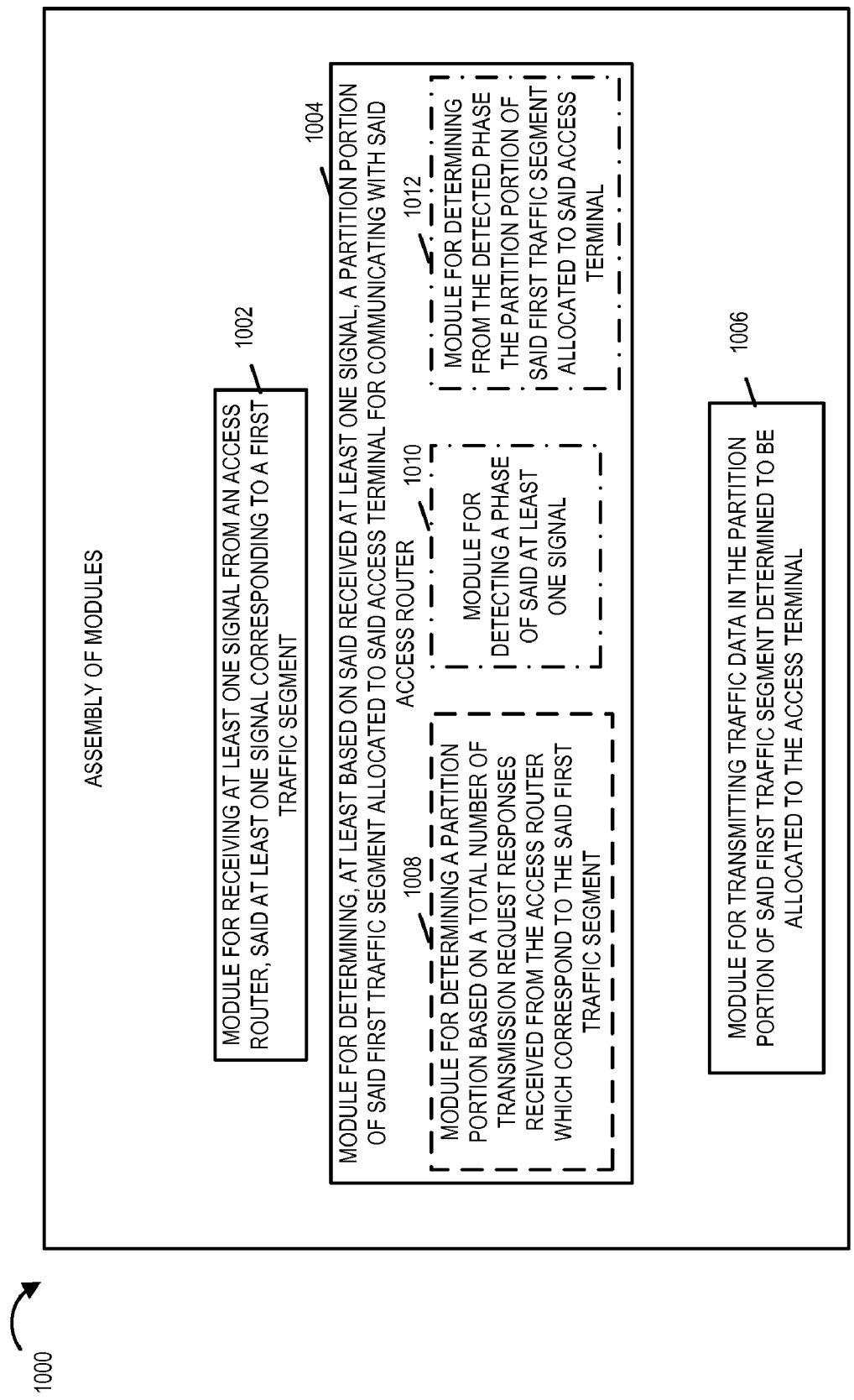
FIG. 10 is a drawing of an assembly of modules that may be used in the access terminal of FIG. 9.

FIG. 10 is an assembly of modules 1000 which can, and in some embodiments are, used in the access terminal 900 illustrated in FIG. 9. The modules in the assembly 1000 can be implemented in hardware within the processor 902 of FIG. 9, e.g., as individual circuits. Alternatively, the modules may be implemented in software and stored in the memory 904 of the access terminal 900 shown in FIG. 9. While shown in the FIG. 9 embodiment as a single processor, e.g., computer, it should be appreciated that the processor 902 may be implemented as one or more processors, e.g., computers. When implemented in software the modules include code, which when executed by the processor, configure the processor, e.g., computer, 902 to implement the function corresponding to the module. In embodiments where the assembly of modules 1000 is stored in the memory 904, the memory 904 is a computer program product comprising a computer readable medium comprising code, e.g., individual code for each module, for causing at least one computer, e.g., processor 902, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 10 control and/or configure the access terminal 900 or elements therein such as the processor 902, to perform the functions of the corresponding steps illustrated in the method flowchart 800 of FIG. 8.

As illustrated in FIG. 10, the assembly of modules 1000 includes a module 1002 for receiving at least one signal from an access router, said at least one signal corresponding to a first traffic segment; a module 1004 for determining, at least based on said received at least one signal, a partition portion of said first traffic segment allocated to said access terminal for communicating with said access router; and a module 1006 for transmitting traffic data in the partition portion of said first traffic segment determined to be allocated to the access terminal.

The at least one signal, in some embodiments, is a transmission request response signal. The at least one signal, in some embodiments, is an assignment signal indicating partition assignment to the access terminal.

In some embodiments, module 1004 includes one or more of modules 1008, 1010 and 1012. In some embodiments, said at least one signal is one of a plurality of transmission request responses corresponding to said first traffic segment that are transmitted by said access router. Module 1008 is for determining a partition portion based on a total number of transmission request responses received from the access router which correspond to said first traffic segment. In some embodiments, equal partition portions are allocated to each of the access terminals to which a request response is sent. In some embodiments, predetermined fixed size partition portions are allocated to each of the access terminals to which a request response is sent. In some embodiments, different size partition portions are allocated to the access terminals to which a request response is sent, e.g., with portion size being determined as a function of connection priority information, e.g., a higher priority connection is allocated a larger partition portion of the traffic segment than a lower priority connection.

Module 1020 is for detecting a phase of said at least one signal. Module 1010 operates in conjunction with module 1012. Module 1010 is for detecting a phase of said at least one signal. Module 1012 is for determining, from the detected phase, the partition portion of the first traffic segment allocated to said access terminal. In embodiments, there are a number of predetermined fixed partition options, and the detected phase indicates one of said predetermined fixed partition options.

Figure 11:
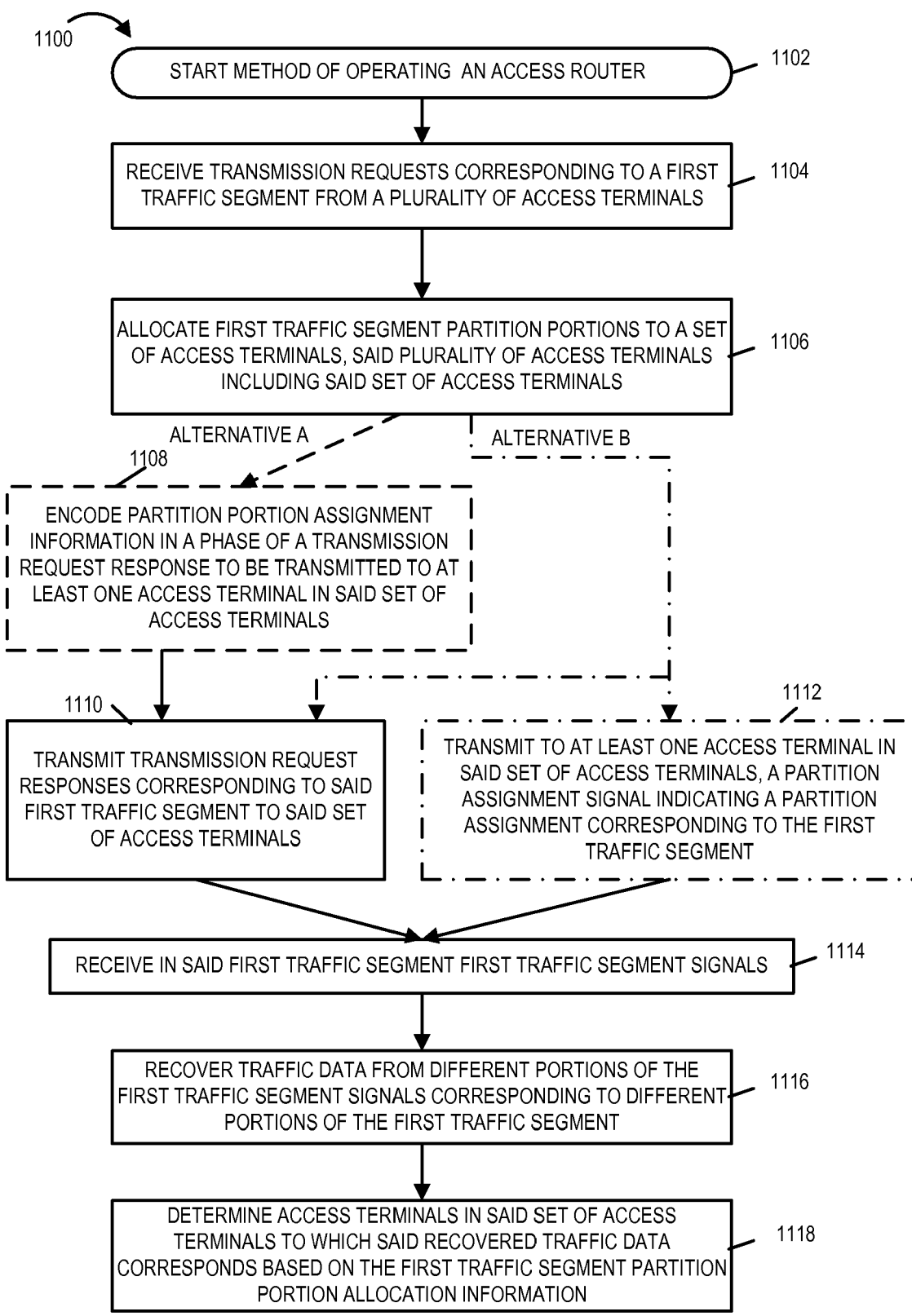
FIG. 11 is a flowchart of an exemplary method of operating an access router in accordance with an exemplary embodiment.

FIG. 11 is a flowchart 1100 of an exemplary method of operating an access router in accordance with an exemplary embodiment. The access router is, e.g., one of the access routers (102, 104) in exemplary peer to peer wireless communications network 100 of FIG. 1. Operation of the exemplary method starts in step 1102, where the access router is powered on and initialized. Operation proceeds from start step 1102 to step 1104.

In step 1104, the access router receives transmission requests corresponding to a first traffic segment from a plurality of access terminals. The access router has existing connections with said plurality of access terminals. In some embodiments, the transmission request responses are single tone OFDM signals. Then, in step 1106 the access router allocates first segment partition portions to a set of access terminals, said plurality of access terminals including said set of access terminals. Two alternative approaches are described. In a first approach partition assignment information is communicated via a transmission request response signal, and operation proceeds from step 1106 to step 1108. In a second alternative approach partition assignment information is communicated via a partition assignment signal and operation proceeds from step 1106 to step 1110 and step 1112.

Returning to step 1108, in step 1108 the access router encodes partition portion assignment information in a phase of the transmission request response transmitted to be transmitted to at least one access terminal in said set of access terminals. Operation proceeds from step 1108 to step 1110. In step 1110 the access router transmits transmission request responses corresponding to said first traffic segment to said set of access terminals. Operation proceeds from step 1110 to step 1114.

Returning to step 1112, in step 1112 the first access router transmits to at least one access terminal in said set of access terminals, a partition assignment signal indicating a partition assignment corresponding to the first traffic segment. In step 1110 the access router transmits transmission request responses corresponding to the first traffic segment to said first set of access terminals. Operation proceeds from steps 1110 and 1112 to step 1114.

In step 1114 the access router receives, in said first traffic segment, first traffic segment signals. Operation proceeds from step 1114 to step 1116, in which the access router recovers traffic data from different portion of the first traffic segment signals corresponding to different portion of the first traffic segment. Operation proceeds from step 1116 to step 1118. In step 1118 the access router determines access terminals in said set of access terminals to which said recovered traffic data corresponds based on the first traffic segment partition portion allocation information.

Figure 12:
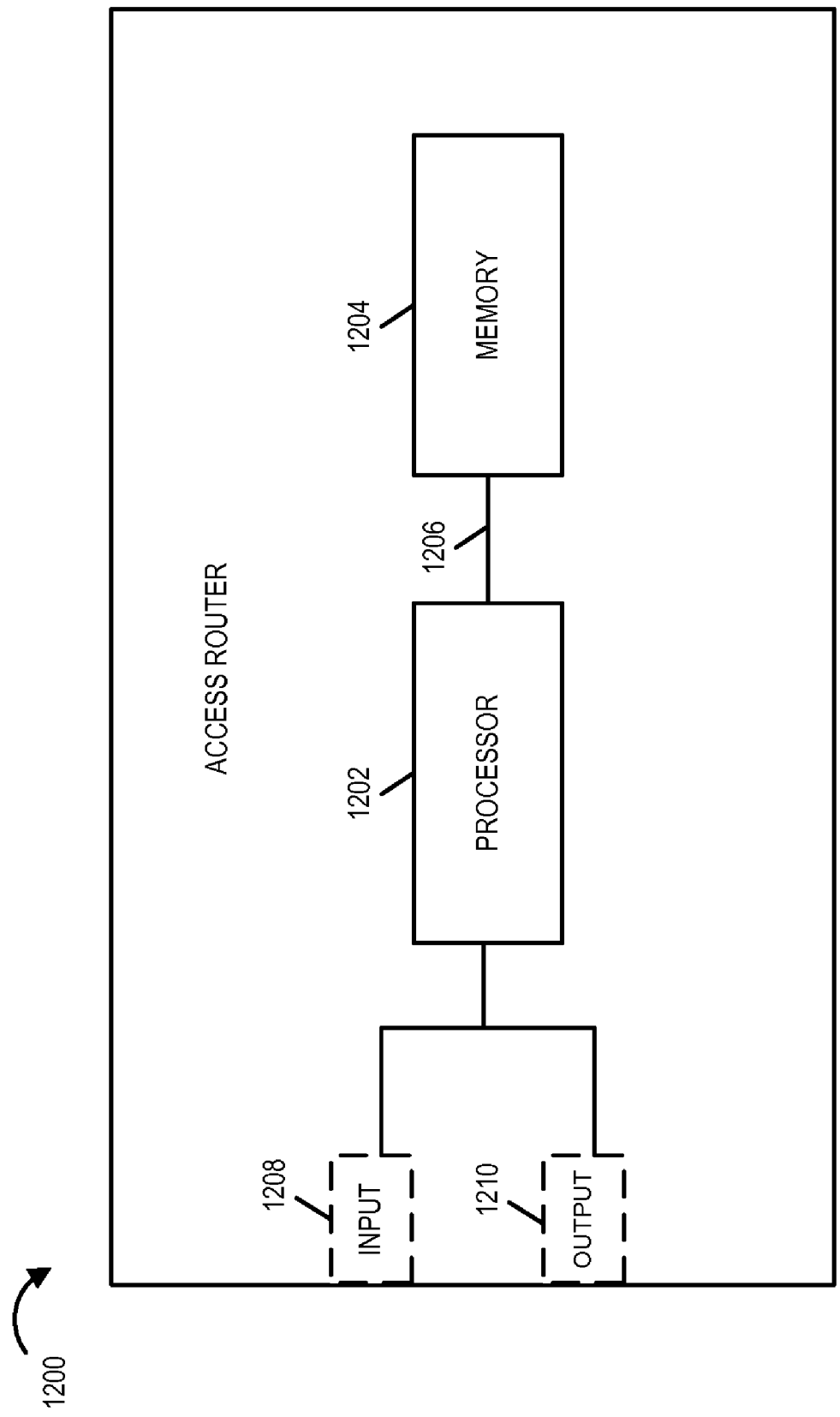
FIG. 12 is a drawing of an exemplary access router, in accordance with an exemplary embodiment.

FIG. 12 is a drawing of an exemplary access router 1200 in accordance with an exemplary embodiment. Exemplary access router 1200 is, e.g., an access router supporting peer to peer communications and implementing a method in accordance with flowchart 1100 of FIG. 11.

Access router 1200 includes a processor 1202 and memory 1204 coupled together via a bus 1206 over which the various elements (1202, 1204) may interchange data and information. Access router 1200 further includes an input module 1208 and an output module 1210 which may be coupled to processor 1202 as shown. However, in some embodiments, the input module 1208 and output module 1210 are located internal to the processor 1202. Input module 1208 can receive input signals. Input module 1208 can, and in some embodiments does, include a wireless receiver and/or a wired or optical input interface for receiving input. Output module 1210 may include, and in some embodiments does include, a wireless transmitter and/or a wired or optical output interface for transmitting output. Processor 1202 is configured to: receive transmission requests corresponding to a first traffic segment from a plurality of access terminals; allocate first traffic segment partition portions to a set of access terminals, said first plurality of access terminals including said set of access terminals; and transmit transmission request responses corresponding to said first traffic segment to said set of access terminals. In some embodiments, the transmission request response signals are single tone OFDM signals. In various embodiments, the access router is further configured to: encode partition portion assignment information in a phase of a transmission request response transmitted to at least one access terminal in said set of access terminals. In some embodiments, processor 1202 is configured to: transmit, to at least one access terminal in said set of access terminals, a partition assignment signal indicating a partition assignment corresponding to the first traffic segment. Processor 1202, in various embodiments, is configured to: receive in said first traffic segment first traffic segment signals; recover traffic data from different portions of said first traffic segment signals corresponding to different portions of said first traffic segment; and determine access terminals in said set of access terminals to which said recovered traffic data corresponds based on the first traffic segment partition portion allocation information.

Figure 13:
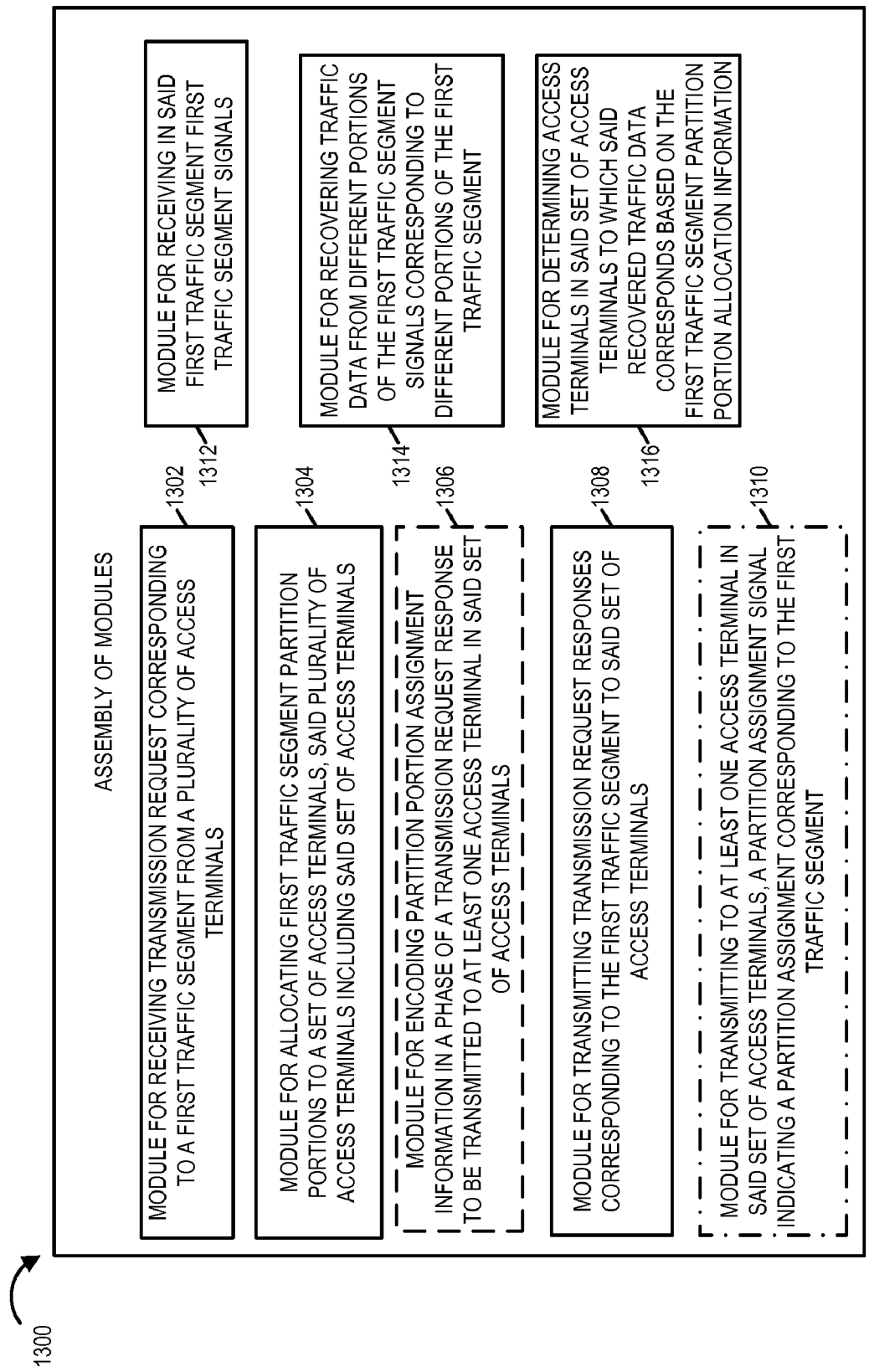
FIG. 13 is a drawing of an assembly of modules that may be used in the access router of FIG. 12.

FIG. 13 is an assembly of modules 1300 which can, and in some embodiments are, used in the access router 1200 illustrated in FIG. 12. The modules in the assembly 1300 can be implemented in hardware within the processor 1202 of FIG. 12, e.g., as individual circuits. Alternatively, the modules may be implemented in software and stored in the memory 1204 of the access router 1200 shown in FIG. 12. While shown in the FIG. 12 embodiment as a single processor, e.g., computer, it should be appreciated that the processor 1202 may be implemented as one or more processors, e.g., computers. When implemented in software the modules include code, which when executed by the processor, configure the processor, e.g., computer, 1202 to implement the function corresponding to the module. In embodiments where the assembly of modules 1300 is stored in the memory 1204, the memory 1204 is a computer program product comprising a computer readable medium comprising code, e.g., individual code for each module, for causing at least one computer, e.g., processor 1202, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 13 control and/or configure the access router 1200 or elements therein such as the processor 1202, to perform the functions of the corresponding steps illustrated in the method flowchart 1100 of FIG. 11.

As illustrated in FIG. 13, the assembly of modules 1300 includes: a module 1302 for receiving transmission requests corresponding to a first traffic segment from a plurality of access terminals; a module 1304 for allocating first traffic segment partition portions to a set of access terminals, said plurality of access terminals including said set of access terminals; and a module 1308 for transmitting transmission request responses corresponding to the first traffic segment to said set of access terminals. In some embodiments, the transmission request responses are single tone OFDM signals.

The assembly of modules 1300, in some embodiments, further includes one of: a module 1306 for encoding partition portion assignment information in a phase of a transmission request response to be transmitted to at least one access terminal in said set of access terminals and a module 1310 for transmitting to at least one access terminal in said set of access terminals, a partition assignment signal indicating a partition assignment corresponding to the first traffic segment. Assembly of modules 1300 further includes a module 1312 for receiving in said first traffic segment first traffic segment signals; a module 1314 for recovering traffic data from different portions of the first traffic segment signals corresponding to different portions of the first traffic segment; and a module 1316 for determining access terminals in said set of access terminals to which said recovered traffic data corresponds based on the first traffic segment partition portion allocation information.

Figure 14:
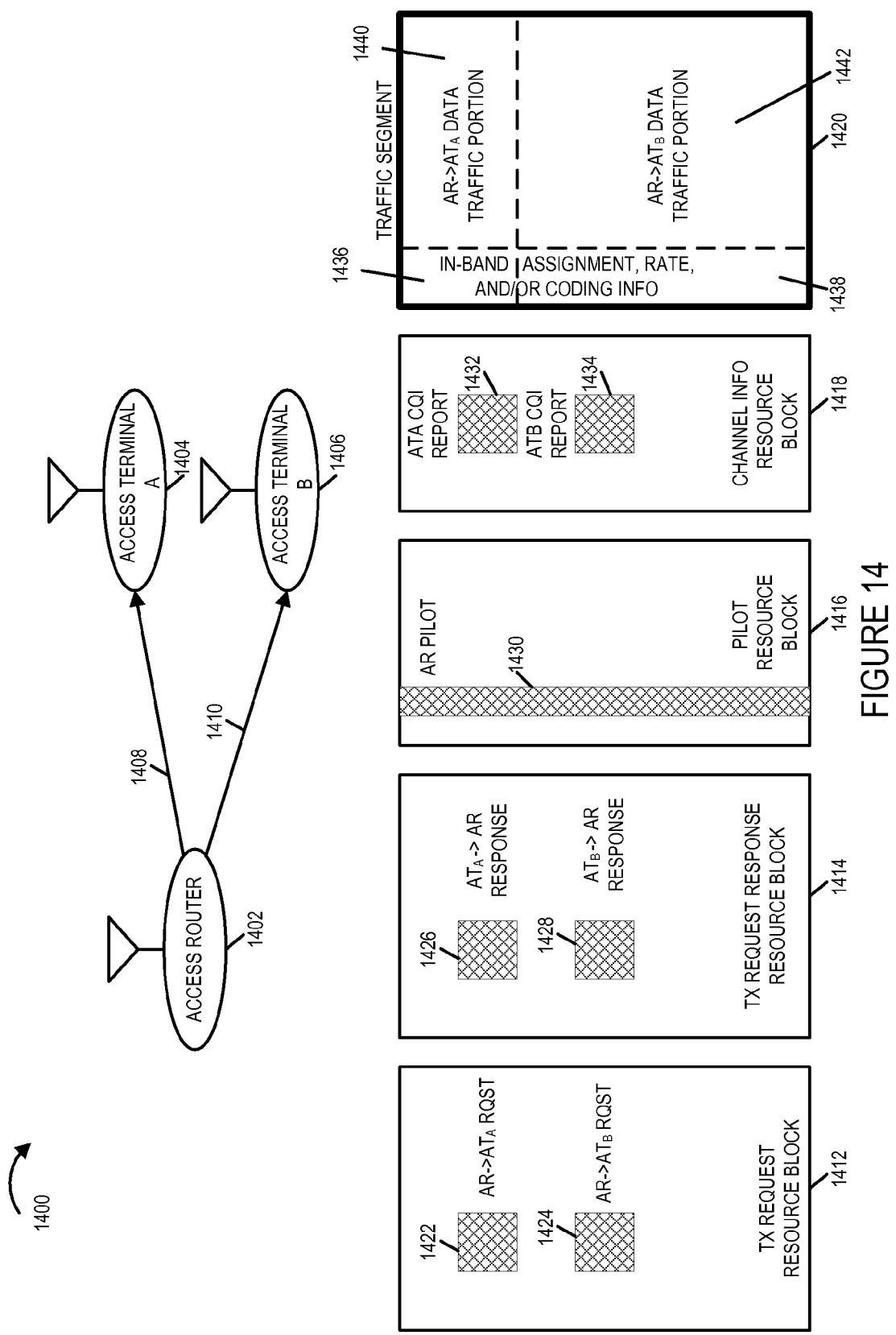
FIG. 14 is a drawing illustrating an exemplary partition of a traffic segment in accordance with an exemplary embodiment.

FIG. 14 is a drawing 1400 illustrating an exemplary partition of a traffic segment in accordance with an exemplary embodiment. FIG. 14 illustrates an exemplary access router 1402 and two exemplary access terminals (access terminal A 1404, access terminal B 1406). The exemplary access router 1402 is, e.g., an access router implementing the method of flowchart 200 of FIG. 2 and/or in accordance with access router 300 of FIG. 3. The access terminals (access terminal A 1404, access terminal B 1406) are, e.g., access terminals implementing the method of flowchart 500 of FIG. 5 and/or in accordance with access terminal 600 of FIG. 6.

For the purposes of the example of FIG. 14, consider that access router 1402 and access terminal (1404, 1406) are part of a peer to peer communications network such as network 100 of FIG. 1, that the access router 1402 has a first peer to peer connection with access terminal A 1404, that the access router 1402 has a second peer to peer connection with access terminal B 1406, and that the access router 1402 desires to transmit: traffic data to access terminal A 1404 in traffic segment 1420 and traffic data to access terminal B 1406 in traffic segment 1420.

Also, for the purposes of this example, further consider that the peer to peer network uses a recurring peer to peer timing structure including a plurality of traffic slots, of which one exemplary slot is illustrated in FIG. 14. The exemplary traffic slot includes a transmission request resource block 1412, a transmission request response resource block 1414, a pilot resource block 1416, a channel information resource block 1418 and a traffic segment 1420. The transmission request resource block 1412 and the transmission request response resource block 1414 may be considered resources used for connection scheduling, while the pilot resource block 1416 and the channel information resource block 1418 may be considered resources used for rate scheduling.

Access router 1402 transmits traffic transmission request 1422 to access terminal A 1404 and traffic transmission request 1424 to access terminal B 1406, requesting to transmit traffic in traffic segment 1420. Consider that that both access terminal A 1404 and access terminal B 1406 receive the respective requests (1422, 1424) and decide to agree to the requests, e.g., access terminals (1404, 1406) decide not to receiver yield. Access terminal A 1404 generates and transmits transmission request response 1426 to the access router 1402. Access terminal B 1406 generates and transmits transmission request response 1428 to the access router 1402.

Consider that the access router 1402 receives the request responses (1426, 1428), signifying that the access terminals (1404, 1406) acquiesce to the requests (1422, 1424), respectively. Further consider that the access router 1402 decides not to transmitter yield, and thus transmits pilot signal 1430. In some embodiments, separate pilot signals are generated and transmitted to the different access terminals (1404, 1406).

The access terminals (1404, 1406) receive and measure pilot signal 1430 and generate channel quality indicator reports which are communicated in signals (1432, 1434), respectively. The access router 1402 receives the channel quality indicator reports (1432, 1434). The access router 1402 makes a segment partitioning decision as a function of at least one of: channel quality information, quality of service information, loading information, and interference information. In this example, the access router has decided to allocate 25% of the available traffic segment data resources to access terminal A 1404 as indicated by traffic portion 1440 and 75% of the available traffic segment data resources to access terminal B 1406 as indicated by traffic portion 1442.

The access router 1402 generates in-band assignment, rate, and/or coding information signals which it communicates in resources 1436 and/or 1438 of traffic segment 1420. In some embodiments, separate in-band control signaling air link resources of traffic segment 1420 are associated with each assignment. In some embodiments, a common in-band control air link resource of traffic segment 1420 is used. In this example, assume that the control information signals directed to access terminal A 1404 inform access terminal A 1404 that it is to receive traffic signals in portion 1440 at data rate 0, where data rate 0 indicates: bit coding rate, e.g., information bits to coded bits, codeword information, and a modulation scheme and/or constellation, e.g., one of BPSK, QPSK, QAM 16, QAM 64, QAM 256. Further consider that the control information signals directed to access terminal B 1406 inform access terminal B 1406 that it is to receive traffic signals in portion 1442 at data rate 1, where data rate 1 indicates: bit coding rate, codeword information, and a modulation scheme and/or constellation, where at least one of: bit coding rate, codeword information, modulation scheme, and constellation are different from that of data rate 0. In some embodiments, transmission power information can also be, and sometimes is, different for at least some of the different traffic segment portions.

The access router 1402 transmits traffic signals 1408 to access terminal A 1404 which it communicates in traffic segment portion 1440. The access router 1402 transmits traffic signals 1410 to access terminal B 1406 which it communicates in traffic segment portion 1442. Although partition portions shown in this example are represented as contiguous blocks, in some embodiments, a portion includes a set of air link resources, e.g., OFDM tone-symbols, which may not be contiguous, e.g., due to a tone hopping implementation.

Access terminal A 1404 receives and recovers control information in one or more of resources 1436 and 1438 of traffic segment 1420. Access terminal A 1404 uses the recovered control information, e.g., assignment information, rate information, coding information, modulation information, etc, to identify that traffic signals are being directed to it in portion 1440 of traffic segment 1420, and to recover the traffic data information being communicated. Access terminal B 1406 receives and recovers control information in one or more of resources 1436 and 1438 of traffic segment 1420. Access terminal B 1406 uses the recovered control information, e.g., assignment information, rate information, coding information, modulation information, etc, to identify that traffic signals are being directed to it in portion 1442 of traffic segment 1420, and to recover the traffic data information being communicated.

In this example, the access router 1402 has decided to transmit traffic to multiple access terminals in the same traffic segment and has partitioned the traffic segment. In some embodiments, information identifying a partition size for a portion, e.g., number of OFDM tone-symbols, and information identifying which resources, e.g., which OFDM tone-symbols, are included in a partition portion is communicated in the in-band control signaling of the traffic segment. In some embodiments, the partitioning is in accordance with a fixed set of possible alternatives, and the access router 1402 communicates in-band control information to identify the particular selected alternative corresponding to a particular access terminal which has been allocated a partition portion. This approach can reduce the amount of in-band control signaling, e.g., at the expensive of flexibility. In some embodiments connection and/or device identification information is communicated in the in-band control signaling of the traffic segment.

The access router 1402 may, at times, decide not to partition a traffic segment. In some such embodiments, the access router, under such a scenario uses the entire traffic segment for traffic data for one access terminal. In some embodiments, the amount of a traffic segment used for in-band control signaling and the amount used to carry actual data traffic varies as a function of whether of not the segment is partitioned. In some embodiments, the amount of a traffic segment used for in-band control signaling and the amount used to carry actual data traffic varies as a function of the number of partition portions.

The access router 1402 may, at times, have received request responses from a first subset of access terminals and decided to partition the traffic segment between a second subset of access terminals, where the second subset of access terminals is smaller than the first subset of access terminals, and wherein the second subset of access terminals is included in the first subset of access terminals.

Assume the traffic slot illustrated in FIG. 14 is part of a recurring peer to peer timing structure. During a first iteration the traffic segment 1420 may be used as shown in FIG. 14, during a second iteration the traffic segment may 1420 may be used to transmit traffic data from the access router 1402 to a single access terminal, during a third iteration the traffic segment 1420 may be used to transmit traffic data from access router 1402 to three access terminals, during a fourth iteration the traffic segment 1420 may be used to transmit traffic data between two access terminals, and during a fifth interval the traffic segment 1420 may be used to transmit traffic from an access terminal to access router 1402.

Figure 15:
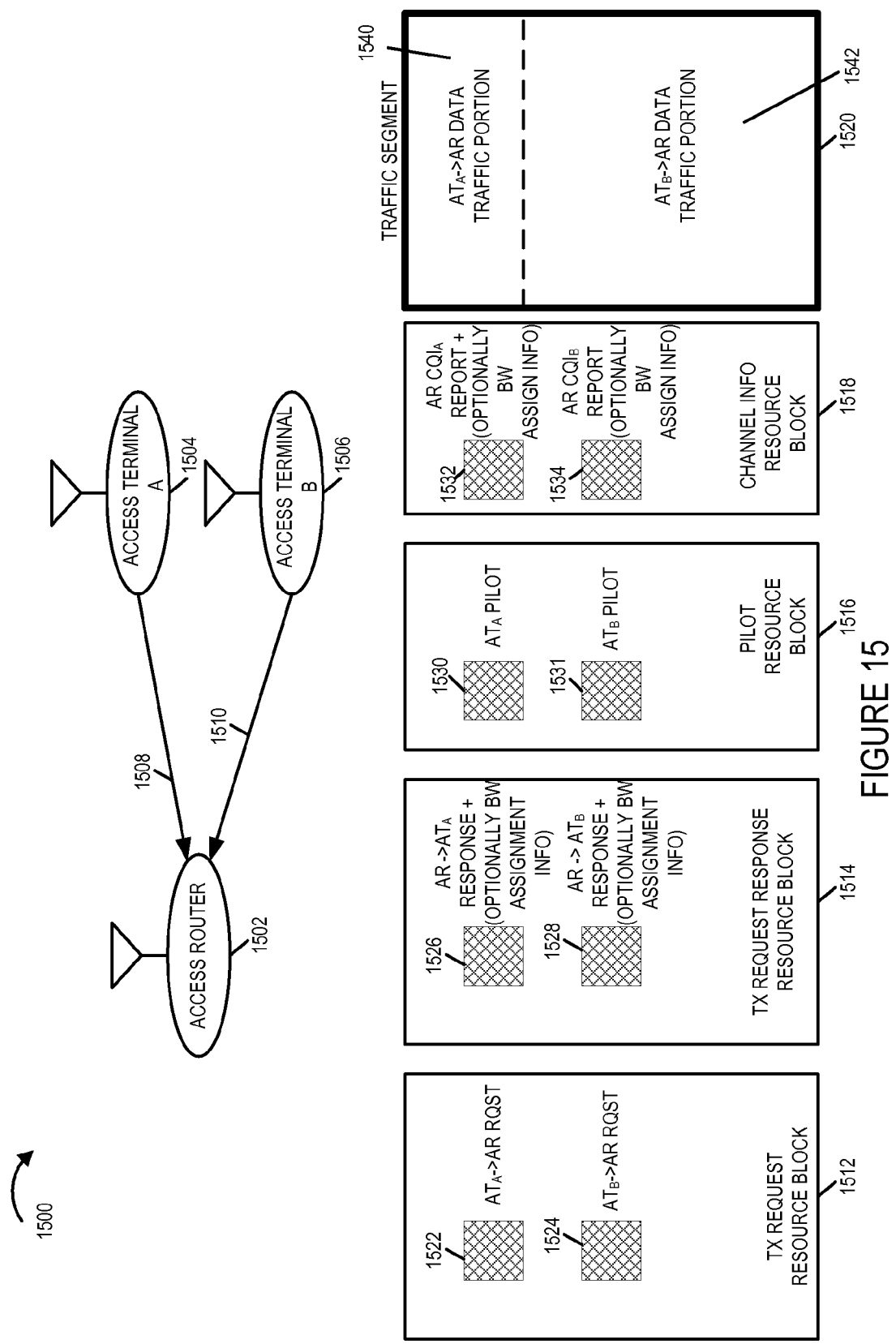
FIG. 15 is a drawing illustrating an exemplary partition of a traffic segment in accordance with an exemplary embodiment.

FIG. 15 is a drawing 1500 illustrating an exemplary partition of a traffic segment in accordance with an exemplary embodiment. FIG. 15 illustrates an exemplary access router 1502 and two exemplary access terminals (access terminal A 1504, access terminal B 1506). The exemplary access router 1502 is, e.g., an access router implementing the method of flowchart 1100 of FIG. 11 and/or in accordance with access router 1200 of FIG. 12. The access terminals (access terminal A 1504, access terminal B 1506) are, e.g., access terminals implementing the method of flowchart 800 of FIG. 8 and/or in accordance with access terminal 900 of FIG. 9.

For the purposes of the example of FIG. 15, consider that access router 1502 and access terminal (1504, 1506) are part of a peer to peer communications network such as network 100 of FIG. 1, that the access router 1502 has a first peer to peer connection with access terminal A 1504, that the access router 1502 has a second peer to peer connection with access terminal B 1506, that the access terminal A 1504 desires to transmit traffic data to access router 1502 in traffic segment 1520 and that access terminal B 1506 desires to transmit traffic data to access router 1502 in traffic segment 1520.

Also, for the purposes of this example, further consider that the peer to peer network uses a recurring peer to peer timing structure including a plurality of traffic slots, of which one exemplary slot is illustrated in FIG. 15. The exemplary traffic slot includes a transmission request resource block 1512, a transmission request response resource block 1514, a pilot resource block 1516, a channel information resource block 1518 and a traffic segment 1520. The transmission request resource block 1512 and the transmission request response resource block 1514 may be considered resources used for connection scheduling, while the pilot resource block 1516 and the channel information resource block 1518 may be considered resources used for rate scheduling.

Access terminal A 1504 transmits traffic transmission request 1522 to access router 1502, and access terminal B 1506 transmits traffic transmission request 1524 to access router 1502, each requesting to transmit traffic in traffic segment 1520. Consider that access router 1502 receive the respective requests (1522, 1524) and decides to agree to both the requests, e.g., access router decides not to receiver yield for either of the requests. Access router 1502 generates and transmits transmission request response 1526 to the access terminal A 1504. Access router 1502 also generates and transmits transmission request response 1528 to the access terminal B 1506. In some embodiments, the request response signals also convey bandwidth assignment information corresponding to the traffic segment, e.g., via the phase of the request response signals. In some embodiments, if the access router only sends a single transmission request response, the access terminal to which the signal request response is directed is allocated to use 100% of the traffic segment 1520. In some embodiments, if the access router sends multiple request responses, the access router 1502 partitions the traffic segment between the access terminals to which it has sent the multiple request responses. In some such embodiments, there are a fixed number of predetermined partition options. In some embodiments, partition information for the traffic segment is conveyed via phase of the transmission request response signals.

Consider that the access terminal A 1504 receives request response 1526, signifying that access router 1502 acquiesces to the request 1522. Further consider that the access terminal A 1504 decides not to transmitter yield, and thus transmits pilot signal 1530. Consider that the access terminal B 1506 receives request response 1528, signifying that access router 1502 acquiesces to the request 1524. Further consider that the access terminal B 1506 decides not to transmitter yield, and thus transmits pilot signal 1531.

The access router 1502 receives and measure the pilot signals (1530, 1531), respectively, generates individual channel quality indicator reports which are communicated in signals (1532, 1534), respectively. In some embodiments, as an alternative approach to communicating bandwidth assignment information pertaining to the partitioning of traffic segment 1520 in the transmission request response signaling, the bandwidth partitioning information is communicated with the channel quality indicator reports. In some other embodiments, the partition assignment information is communicated in a partition assignment message signal.

Access terminal A 1504 receives and recovers the channel quality indicator report 1532. The access terminal A 1504 also receives and recovers the traffic segment bandwidth assignment information, e.g., communicated in the request response signaling, communicated in the channel quality indicator signaling, or communicated in a partition assignment signal. Access terminal A determines from the received bandwidth assignment information that it is to use partition portion 1540 of traffic segment 1520 to transmit traffic signals to access router 1502. Access terminal A 1504 determines a data rate to use for the traffic signals as a function of the received channel quality indicator report 1532.

Access terminal B 1506 receives and recovers the channel quality indicator report 1534. The access terminal B 1506 also receives and recovers the traffic segment bandwidth assignment information, e.g., communicated in the request response signaling or communicated in the channel quality indicator signaling. Access terminal B 1504 determines from the received bandwidth assignment information that it is to use partition portion 1542 of traffic segment 1520 to transmit traffic signals to access router 1502. Access terminal B 1506 determines a data rate to use for the traffic signals as a function of the received channel quality indicator report 1534.

Access terminal A 1504 transmits traffic signals 1508 to access router 1502 in portion 1542 of traffic segment 1520. Access terminal B 1506 transmits traffic signals 1510 to access router 1502 in portion 1540 of traffic segment 1520. Access router 1502 receives the traffic signals 1508 and 15 10. Access router 1502 uses stored traffic segment bandwidth assignment information to identify which received traffic signals pertain to access terminal A 1504 and which pertain to access terminal B 1506.

Although partition portions shown in this example are represented as contiguous blocks, in some embodiments, a portion includes a set of air link resources, e.g., OFDM tone-symbols, which may not be contiguous, e.g., due to a tone hopping implementation.

In this example, the access router 1502 has decided to receive traffic from multiple access terminals in the same traffic segment and has partitioned the traffic segment. In some embodiments, information identifying a partition size for a portion, e.g., number of OFDM tone-symbols, and information identifying which resources, e.g., which OFDM tone-symbols, are included in a partition portion is communicated in one of the request response signaling and channel information report signaling. In some other embodiments traffic segment partition information is communicated in another type of signal, e.g., a signal reserved specifically for traffic segment partition information. In some embodiments, the partitioning is in accordance with a fixed set of possible alternatives, and the access router 1502 communicates information to identify the particular selected alternative corresponding to a particular access terminal which has been allocated a partition portion. For example, in some embodiments, the four different phase alternatives corresponding to QPSK can be used to communicate four possible segmentation patterns. In some embodiments connection and/or device identification information is communicated with the partition information.

In some embodiments, an access terminal tracks other requests and/or request responses corresponding to the same traffic segment and the same access router, and the access terminal uses such information in determining partitioning allocation.

The access router 1502 may, at times, decide not to partition a traffic segment. In some such embodiments, the access router, under such a scenario uses the entire traffic segment for traffic data for one access terminal.

The access router 1502 may, at times, have received requests from a first subset of access terminals and decided to partition the traffic segment between a second subset of access terminals, where the second subset of access terminals is smaller than the first subset of access terminals, and wherein the second subset of access terminals is included in the first subset of access terminals.

Assume the traffic slot illustrated in FIG. 15 is part of a recurring peer to peer timing structure. During a first iteration the traffic segment 1520 may be used as shown in FIG. 15, during a second iteration the traffic segment 1520 may be used by access router 1502 to receive traffic data from a single access terminal, during a third iteration the traffic segment 1520 may be used by access router 1502 to receive traffic data from three access terminals, during a fourth iteration the traffic segment 1520 may be used to transmit traffic data between two access terminals, and during a fifth interval the traffic segment 1520 may be used by access router 1502 to transmit traffic to one or more access terminals.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating an access terminal, the method comprising:
receiving at least one signal from an access router, said at least one signal corresponding to a first traffic segment; and determining, at least based on said received at least one signal, a partition portion of said first traffic segment allocated to said access terminal for communicating with said access router
transmitting traffic data in the partition portion of said first traffic segment determined to be allocated to said access terminal
wherein said at least one signal is one of a plurality of transmission request responses corresponding to said first traffic segment that are transmitted by said access router; and wherein determining a partition portion of said first traffic segment allocated to said access terminal includes determining a partition portion based on a total number of transmission request responses received from said access router which correspond to said first traffic segment.

2. The method of claim 1, wherein said at least one signal is an assignment signal indicating partition assignment to the access terminal.

3. A method of operating an access terminal, the method comprising:
receiving at least one signal from an access router, said at least one signal corresponding to a first traffic segment; and determining, at least based on said received at least one signal, a partition portion of said first traffic segment allocated to said access terminal for communicating with said access router
transmitting traffic data in the partition portion of said first traffic segment determined to be allocated to said access terminal
wherein determining a partition portion of said first traffic segment allocated to said access terminal includes: detecting a phase of said at least one signal; and
determining from the detected phase the partition portion of said first traffic segment allocated to said access terminal.

4. The method of claim 3, wherein there are a number of predetermined fixed partition options, the detected phase indicating one of said predetermined fixed partition options.

5. The method of claim 4, wherein said at least one signal is a transmission request response signal.

6. An access terminal comprising:
at least one processor configured to:
receive at least one signal from an access router, said at least one signal corresponding to a first traffic segment; and determine, at least based on said received at least one signal, a partition portion of said first traffic segment allocated to said access terminal for communicating with said access router; and memory coupled to said at least one processor wherein said at least one processor is further configured to transmit traffic data in the partition portion of said first traffic segment determined to be allocated to said access terminal
wherein said at least one signal is one of a plurality of transmission request responses corresponding to said first traffic segment that are transmitted by said access router; and wherein said at least one processor is further configured to determine a partition portion of said first traffic segment allocated to said access terminal includes determining a partition portion based on a total number of transmission request responses received from said access router which correspond to said first traffic segment.

7. The access terminal of claim 6, wherein said at least one processor is further configured to: detect a phase of said at least one signal; and determine from the detected phase the partition portion of said first traffic segment allocated to said access terminal.

8. The access terminal of claim 7, wherein there are a number of predetermined fixed partition options, the detected phase indicating one of said predetermined fixed partition options.

9. The access terminal of claim 8, wherein said at least one signal is a transmission request response signal.

10. The access terminal of claim 6, wherein said at least one signal is an assignment signal indicating partition assignment to the access terminal.

11. An access terminal comprising:
means for receiving at least one signal from an access router, said at least one signal corresponding to a first traffic segment; and means for determining, at least based on said received at least one signal, a partition portion of said first traffic segment allocated to said access terminal for communicating with said access router and
means for transmitting traffic data in the partition portion of said first traffic segment determined to be allocated to said access terminal
wherein said at least one signal is one of a plurality of transmission request responses corresponding to said first traffic segment that are transmitted by said access router; and wherein said means for determining a partition portion of said first traffic segment allocated to said access terminal includes means for determining a partition portion based on a total number of transmission request responses received from said access router which correspond to said first traffic segment.

12. The access terminal of claim 11, wherein said means for determining a partition portion of said first traffic segment allocated to said access terminal includes: means for detecting a phase of said at least one signal; and means determining from the detected phase the partition portion of said first traffic segment allocated to said access terminal.

13. The access terminal of claim 12, wherein there are a number of predetermined fixed partition options, the detected phase indicating one of said predetermined fixed partition options.

14. The access terminal of claim 13, wherein said at least one signal is a transmission request response signal.

15. A computer program product comprising:
a computer readable medium comprising:
code for causing at least one computer to receive at least one signal from an access router, said at least one signal corresponding to a first traffic segment; and determining, at least based on said received at least one signal, a partition portion of said first traffic segment allocated to said access terminal for communicating with said access router
code for causing at least one computer to transmit traffic data in the partition portion of said first traffic segment determined to be allocated to said access terminal
wherein said at least one signal is one of a plurality of transmission request responses corresponding to said first traffic segment that are transmitted by said access router; and wherein determining a partition portion of said first traffic segment allocated to said access terminal includes determining a partition portion based on a total number of transmission request responses received from said access router which correspond to said first traffic segment.

* * * * *